United States Patent
Yoshida et al.

(10) Patent No.: US 8,258,459 B2
(45) Date of Patent: Sep. 4, 2012

(54) OPTICAL ENCODER AND MOTOR SYSTEM COMPRISING DUAL DECENTERED ANNULAR SLITS

(75) Inventors: Yasushi Yoshida, Fukuoka (JP); Yosuke Yamaguchi, Fukuoka (JP); Koji Suzuki, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 439 days.

(21) Appl. No.: 12/717,135

(22) Filed: Mar. 4, 2010

(65) Prior Publication Data
US 2010/0224768 A1    Sep. 9, 2010

(30) Foreign Application Priority Data
Mar. 9, 2009  (JP) .................. 2009-054848

(51) Int. Cl.
*G01D 5/34* (2006.01)
(52) U.S. Cl. ............ 250/231.18; 356/617; 359/436
(58) Field of Classification Search ............ 250/231.13–231.18, 237 G, 237 R; 356/616–619; 341/11, 13, 31; 359/436–442, 359/566; 33/1 PT, 1 N
See application file for complete search history.

(56) References Cited

U.S. PATENT DOCUMENTS

| | | | | |
|---|---|---|---|---|
| 5,734,160 A | * | 3/1998 | Chung et al. | ............. 250/231.13 |
| 7,903,262 B2 | * | 3/2011 | Wagner et al. | ................. 356/616 |
| 2008/0087805 A1 | * | 4/2008 | Kress | ....................... 250/231.13 |

FOREIGN PATENT DOCUMENTS
JP  2009-058243  3/2009
* cited by examiner

*Primary Examiner* — Francis M Legasse, Jr.
(74) *Attorney, Agent, or Firm* — Ditthavong Mori & Steiner, P.C.

(57) ABSTRACT

An optical encoder includes a rotation disc, an annular slit, a light source, an absolute-value-related detecting unit, and a signal processing device. The annular slit includes a first annular slit and a second annular slit which are decentered in a mutually different direction. The light source is configured to irradiate light on the annular slit. The absolute-value-related detecting unit is configured to detect transmitted light or reflected light irradiated from the light source and transmitted or reflected at the annular slit to output a detected signal. The absolute-value-related detecting unit includes a first detecting unit corresponding to the first annular slit and a second detecting unit corresponding to the second annular slit. The signal processing device is configured to detect an absolute rotational angle of the rotation disc based on the detected signal output from the absolute-value-related detecting unit.

12 Claims, 31 Drawing Sheets

OPTICAL ENCODER AND MOTOR SYSTEM COMPRISING DUAL DECENTERED ANNULAR SLITS

CROSS-REFERENCE TO RELATED APPLICATIONS

The present application claims priority under 35 U.S.C. §119 to Japanese Patent Application No. 2009-054848, filed Mar. 9, 2009. The contents of this application are incorporated herein by reference in their entirety.

BACKGROUND OF THE INVENTION

1. Field of the Invention

The present invention relates to an optical encoder, a motor, and a motor system.

2. Discussion of the Background

Heretofore, there has been an optical encoder wherein, in order to detect the absolute angle of the rotation axis of a rotator, multiple concentric annular slits decentered as to the rotation center of the rotation axis are formed on a rotation disc, the decentered amount of this concentric annular slits is detected, and the absolute angle of the rotation disc is detected from the decentered amount thereof (see Japanese Patent Application No. 2007-223499 (Japanese Unexamined Patent Application Publication No. 2009-058243)). That is to say, upon the concentric slits being rotated around the rotation axis, the concentric slits thereof are formed in a decentered manner as to the rotation axis, and accordingly, distance from the rotation axis to the detected position of a concentric slit changes according to the rotational angle. Therefore, according to this optical encoder, the rotational angle of the optical disc is detected according to this distance.

SUMMARY OF THE INVENTION

According to one aspect of the present invention, an optical encoder includes a rotation disc, an annular slit, a light source, an absolute-value-related detecting unit, and a signal processing device. The rotation disc is attached to a rotation axis and rotatable together with the rotation axis. The annular slit is provided to the rotation disc and includes multiple equal-pitched concentric slit patterns formed to be decentered as to a rotation center of the rotation disc. The annular slit includes a first annular slit and a second annular slit which are decentered in a mutually different direction. The light source is configured to irradiate light on the annular slit. The absolute-value-related detecting unit is configured to detect transmitted light or reflected light irradiated from the light source and transmitted or reflected at the annular slit to output a detected signal. The absolute-value-related detecting unit includes a first detecting unit corresponding to the first annular slit and a second detecting unit corresponding to the second annular slit. The signal processing device is configured to detect an absolute rotational angle of the rotation disc based on the detected signal output from the absolute-value-related detecting unit.

According to another aspect of the present invention, a motor includes an optical encoder and a motor unit. The rotation disc is attached to a rotation axis and rotatable together with the rotation axis. The annular slit is provided to the rotation disc and includes multiple equal-pitched concentric slit patterns formed to be decentered as to a rotation center of the rotation disc. The annular slit includes a first annular slit and a second annular slit which are decentered in a mutually different direction. The light source is configured to irradiate light on the annular slit. The absolute-value-related detecting unit is configured to detect transmitted light or reflected light irradiated from the light source and transmitted or reflected at the annular slit to output a detected signal. The absolute-value-related detecting unit includes a first detecting unit corresponding to the first annular slit and a second detecting unit corresponding to the second annular slit. The signal processing device is configured to detect an absolute rotational angle of the rotation disc based on the detected signal output from the absolute-value-related detecting unit. The motor unit is configured to rotate the rotation axis of the optical encoder.

According to still another aspect of the present invention, a motor system includes an optical encoder, a motor unit, and a control unit. The rotation disc is attached to a rotation axis and rotatable together with the rotation axis. The annular slit is provided to the rotation disc and includes multiple equal-pitched concentric slit patterns formed to be decentered as to a rotation center of the rotation disc. The annular slit includes a first annular slit and a second annular slit which are decentered in a mutually different direction. The light source is configured to irradiate light on the annular slit. The absolute-value-related detecting unit is configured to detect transmitted light or reflected light irradiated from the light source and transmitted or reflected at the annular slit to output a detected signal. The absolute-value-related detecting unit includes a first detecting unit corresponding to the first annular slit and a second detecting unit corresponding to the second annular slit. The signal processing device is configured to detect an absolute rotational angle of the rotation disc based on the detected signal output from the absolute-value-related detecting unit. The motor unit is configured to rotate the rotation axis of the optical encoder. The control unit is configured to output a control signal for controlling the motor unit to the motor unit based on the absolute rotational angle detected by the optical encoder.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
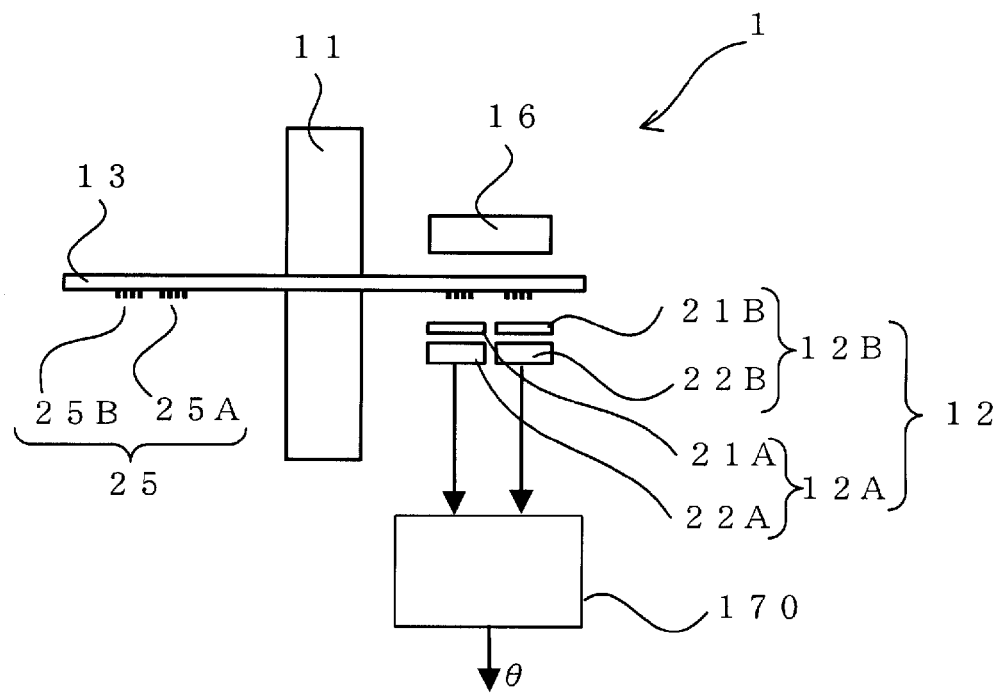
FIG. 1 is a side view of an optical encoder illustrating a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

Configuration of First Embodiment

Figure 2:
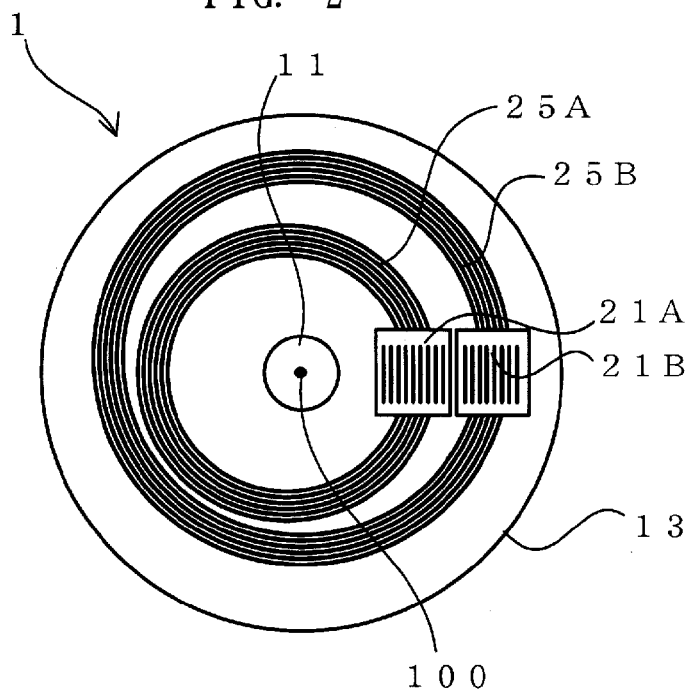
FIG. 2 is a plan view of the optical encoder according to the first embodiment.

FIG. 1 is a side view of an optical encoder illustrating a first embodiment of the present invention, and FIG. 2 is a plan view. Note that the plan view in FIG. 2 is a view viewing FIG. 1 from below in the drawing. As shown in FIGS. 1 and 2, an optical encoder 1 according to the present embodiment principally includes a rotation axis 11, a rotation disc 13, an annular slit 25, a light source 16, a detecting unit 12, and a signal processing device 170.

With the rotation axis 11, a rotator (not shown) of which the rotational angle is measured is connected to one end thereof, and rotates around rotation center 100 in the longitudinal direction of the rotation axis 11 together with the rotation of this rotator.

The rotation disc 13 is connected to the rotation axis 11, and is configured so as to rotate around the rotation center 100 according to the rotation of the rotation axis 11.

The annular slit 25 includes multiple equal-pitched concentric slit patterns provided to the rotation disc 13, and formed in a decentered manner as to the rotation center 100 of the rotation disc 13. Note that the annular slit 25 according to the present embodiment is formed as a transmission slit. Also, the annular slit 25 includes two types of annular slit, i.e., a first annular slit 25A, and a second annular slit 25B.

The first annular slit 25A has, such as shown in FIG. 2, multiple concentric slit patterns decentered as to the rotation center 100 of the rotation disc 13. On the other hand, the second annular slit 25B has multiple concentric slit patterns decentered in a direction different from the first annular slit 25A as to the rotation center 100 of the rotation disc 13. However, with the multiple concentric slit patterns of each of the first annular slit 25A and the second annular slit 25B, the radius from the center of each concentric circle differs, and are provided so as to have the same pitches that are intervals.

The detecting unit 12 is an example of an origin detecting unit, and includes a first detecting unit 12A and a second detecting unit 12B. The first detecting unit 12A and the second detecting unit 12B are provided to a fixed member (not shown) corresponding to the first annular slit 25A and the second annular slit 25B, respectively. Also, the first detecting unit 12A and the second detecting unit 12B are disposed in proximity to the same linear axis in the radial direction of the rotation disc 13.

With the present embodiment, the first detecting unit 12A includes a first fixed slit 21A and a first light reception element 22A, and the second detecting unit 12B includes a second fixed slit 21B and a second light reception element 22B.

Figure 3:
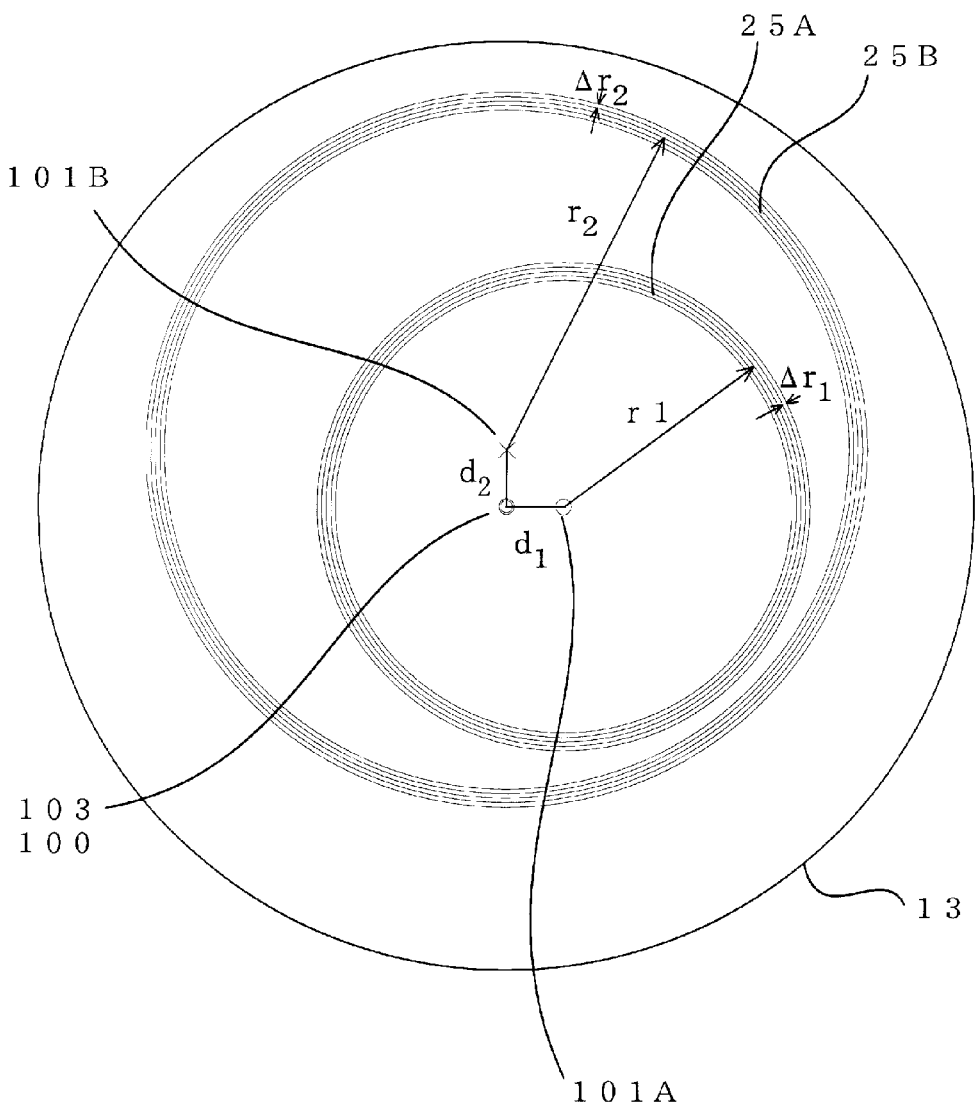
FIG. 3 is a schematic diagram illustrating pattern examples of an annular slit according the first embodiment.

FIG. 3 is a schematic diagram illustrating pattern examples of the annular slit. As shown in FIG. 3, the first annular slit 25A is formed of multiple (five in the drawing) concentric slits of which the radiuses differ in increments of $\Delta r_1$ with the circle having a radius $r_1$ as the middle with point 101A decentered by distance $d_1$ in the x-axis direction as to the center 103 of the rotation disc 13 as the center. The second annular slit 25B is formed of multiple (five in the drawing) concentric slits of which the radiuses differ in increments of $\Delta r_2$ with the circle having a radius $r_2$ as the middle with point 101B decentered by distance $d_2$ in the y-axis direction as to the center 103 of the rotation disc 13 as the center. Subsequently, the center 103 of the rotation disc 13 is attached so as to be identical to the rotation center 100 of the rotation axis 11.

That is to say, with the optical encoder 1 according to the present embodiment, two annular slits decentered in a mutually different direction as to the center 103 of the rotation disc 13 are provided to the rotation disc 13.

Figure 4:
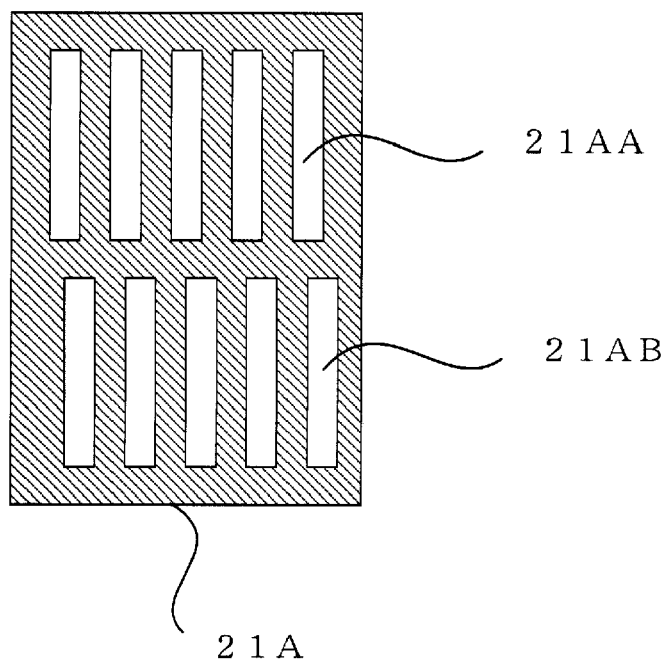
FIG. 4 is a plan view of a fixed slit according to the first embodiment.

FIG. 4 is a plan view of a first fixed slit 21A. With the first fixed slit 21A, an A-phase slit group having multiple slits having the same pitch as those of the annular slit, and a B-phase slit group 21AB of which the opening portions have a phase different from those of the A-phase slit group 21AA are formed.

Figure 5:
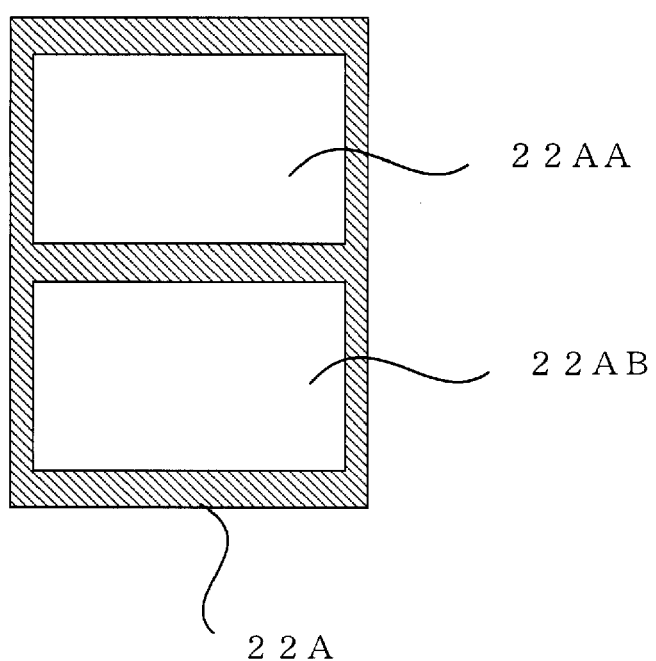
FIG. 5 is a plan view of a first light reception element according to the first embodiment.

FIG. 5 is a plan view of the first light reception element. Corresponding to the A-phase slit group and the B-phase slit group, the first light reception element 22A is also divided into two, namely, an A-phase light reception unit 22AA and a B-phase light reception unit 22AB, as shown in FIG. 5. Though not shown in the drawing, similarly, with the second fixed slit 21BB as well, an A-phase slit group 21BA and a B-phase slit group 21B which have a mutually different phase are formed, and the second light reception element 22B is divided into two, namely, an A-phase light reception unit 22BA and a B-phase light reception unit 22BB.

Thus, the fixed slits and light reception units for A-phase and B-phase are provided corresponding to each of the annular slits 25A and 25B, whereby an A-phase signal and a B-phase signal can be obtained.

The light source 16 irradiates light on the first annular slit 25A and the second annular slit 25B. Note that, with the light source 16, elements may be provided independently for first annular slit 25A and for second annular slit 25B. Also, the signal processing device 170 will be described later in detail.

(Operation of First Embodiment)

Figure 6:
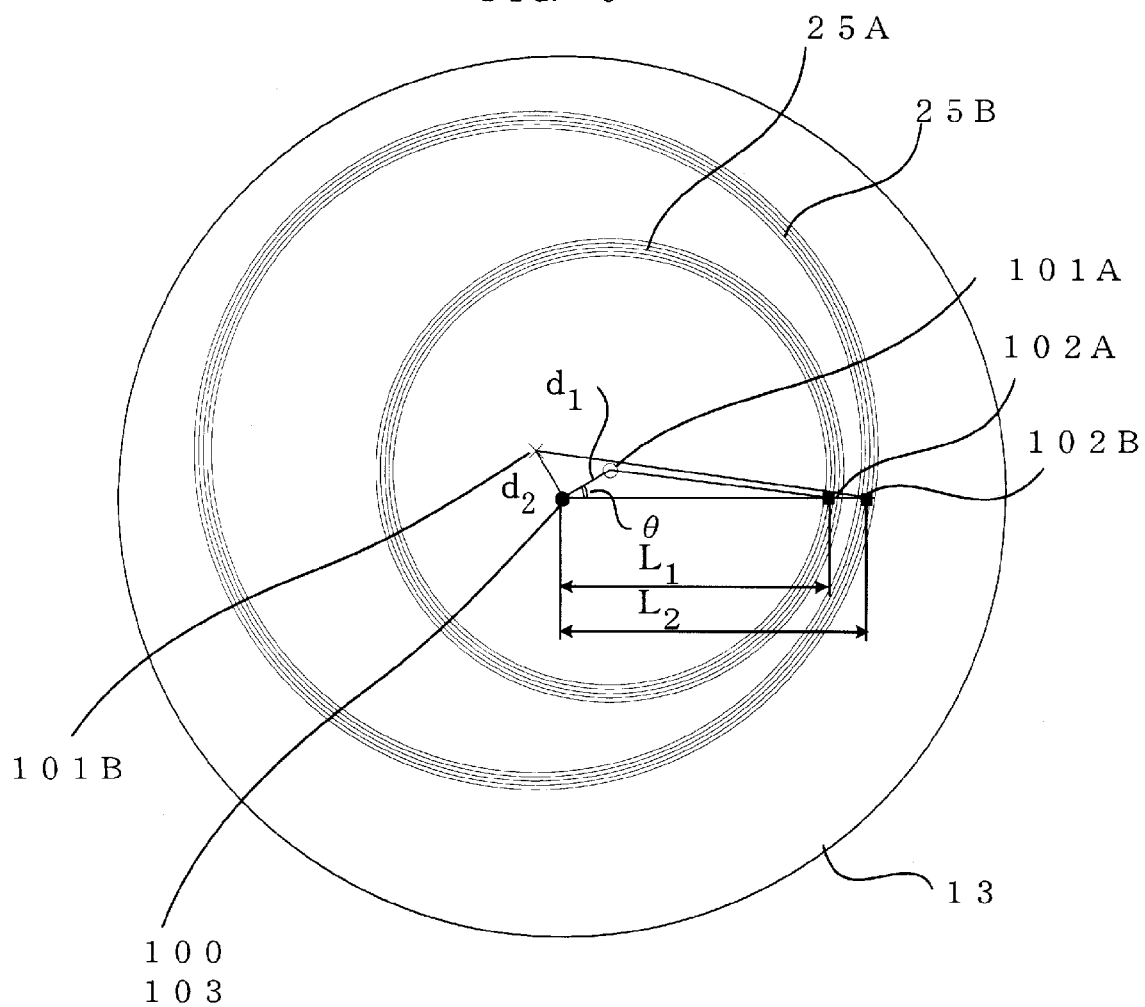
FIG. 6 is a schematic diagram illustrating relationship between a rotational angle θ and distances $L_1$ and $L_2$ when a rotation disc is rotated with the first embodiment.

Next, the operation of the present embodiment will be described. FIG. 6 is a schematic diagram illustrating relationship between a rotational angle θ when a rotation disc is rotated, distance $L_1$ from the rotation center 100 to a position 102A corresponding to the first detecting unit of the first annular slit 25A, and distance $L_2$ from the rotation center 100 to a position 102B corresponding to the second detecting unit of the second annular slit 25B.

In a state wherein the center of the rotation disc 13 is identical to the rotation center 100, upon the rotation axis 11 being rotated, the first annular slit 25A is formed in a decentered manner as to the center 103 of the rotation disc 13, and accordingly, the distance $L_1$ changes according to the rotational angle θ of the rotation axis 11. Similarly, the second annular slit 25B is formed in a decentered manner as to the center 103 of the rotation disc 13, and accordingly, the distance $L_2$ changes according to the rotational angle θ of the rotation axis 11.

Figure 7:
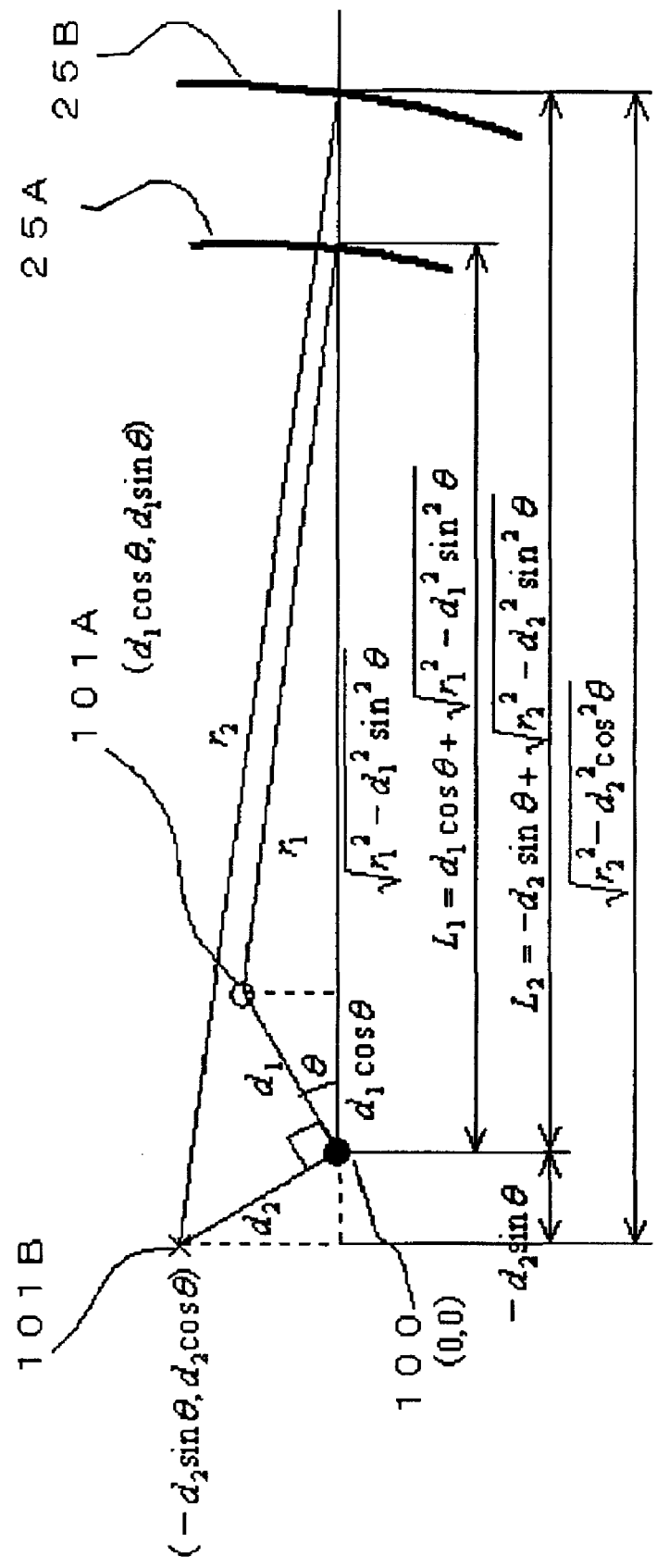
FIG. 7 is a schematic diagram illustrating the relationship between the rotational angle θ and the distances $L_1$ and $L_2$ according to the first embodiment.

FIG. 7 is a schematic view illustrating relationship between the rotational angle θ and the distances $L_1$ and $L_2$, and is a principal enlarged view of FIG. 6. Now, let us consider a state wherein the rotation disc 13 is attached so that the center 103 of the rotation disc 13 is identical to the rotation center 100 of the rotation axis 11, and is rotated by the angle θ. With the rotational angle at the time of the center 101A of the first annular slit 25A being on the x axis as 0 degree, the distance $L_1$ at the time of the rotation disc having rotated by θ is represented as in the following Expression (1).

$$L_1 = d_1 \cos\theta + (r_1^2 - d_1^2 \cdot \sin^2\theta)^{1/2} \tag{1}$$

When $d_1$ is sufficiently small as compared to $r_1$, this expression is approximated as follows.

$$L_1 \cong d_1 \cos\theta + r_1 \tag{2}$$

Similarly, the distance $L_2$ is represented as in the following.

$$L_2 = -d_2 \sin\theta + (r_2^2 - d_2^2 \cdot \sin^2\theta)^{1/2} \tag{3}$$

When $d_2$ is sufficiently small as compared to $r_2$, this expression is approximated as follows.

$$L_2 \cong d_2 \sin\theta + r_2 \tag{4}$$

Figure 8:
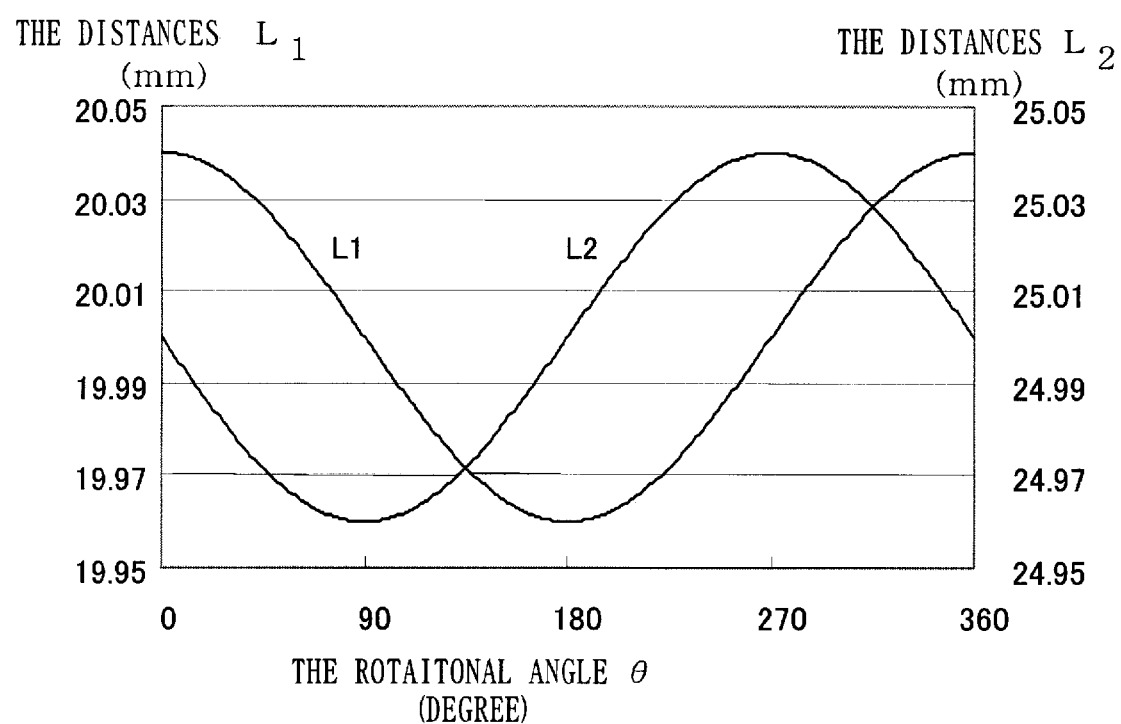
FIG. 8 is a graph illustrating the relationship between the rotational angle θ and the distances $L_1$ and $L_2$ according to the first embodiment.

FIG. 8 is a graph illustrating relationship between the rotational angle θ and the distances $L_1$ and $L_2$, and illustrates relationship between the rotational angle θ in the case that the radius of the annular slit is 20 mm, and the decentered amount of the annular slit is 40 μm, and the distances $L_1$ and $L_2$.

(Signal Processing Device of First Embodiment)

Figure 9:
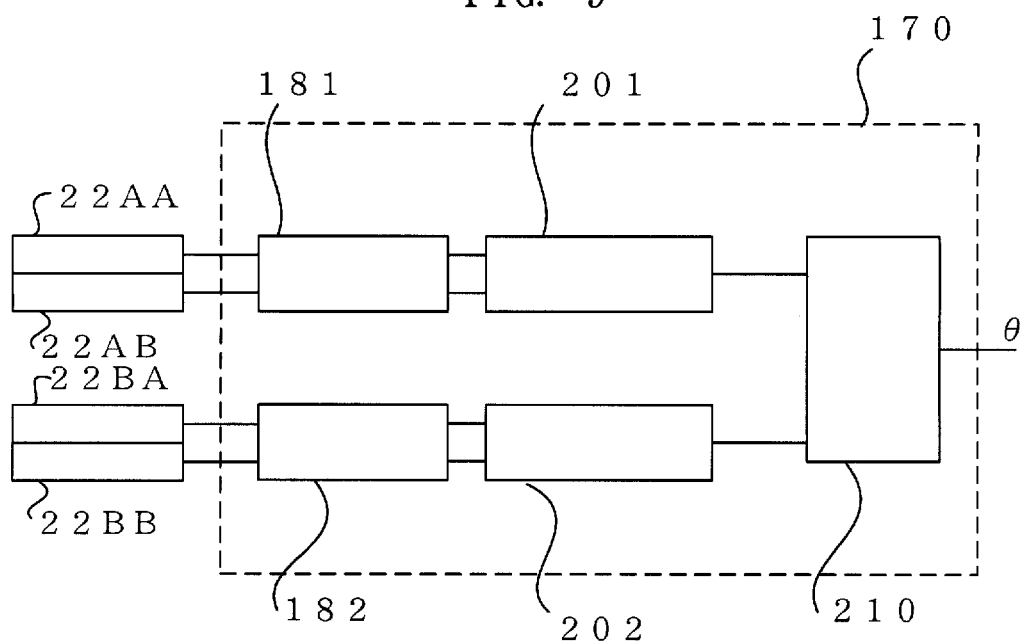
FIG. 9 is a block diagram illustrating a first example of a signal processing device of the optical encoder according to the first embodiment.

Next, a signal processing device for detecting a rotational angle will be described. FIG. 9 is a block diagram illustrating a first example of the signal processing device of the optical encoder according to the present embodiment. As shown in FIG. 9, the signal processing device 170 includes AD conversion elements 181 and 182, a first displacement detection processing unit 201, a second displacement detection processing unit 202, and an angle detection processing unit 210.

The AD conversion element 181 carries out AD conversion of each of two phases of approximate sine-wave signals from the A-phase light reception unit 22AA and the B-phase light reception unit 22AB of the first light reception element 22A generated according to an overlapped state between the first annular slit 25A and the first fixed slit 21A. The AD conversion element 182 carries out AD conversion of each of two phases of approximate sine-wave signals from the A-phase light reception unit 22BA and the B-phase light reception unit 22BB of the second light reception element 22B generated according to an overlapped state between the second annular slit 25B and the second fixed slit 21B.

The first displacement detection processing unit 201 calculates first displacement that is displacement in the radial direction of the rotation axis of the first annular slit 25A based on the two phases of approximate sine-wave signals digitized at the AD conversion element 181. The second displacement detection processing unit 202 calculates second displacement that is displacement in the radial direction of the rotation axis of the second annular slit 25B based on the two phases of approximate sine-wave signals digitized at the AD conversion element 182.

The angle detection processing unit 210 detects a rotational angle based on the first displacement calculated at the first displacement detection processing unit 201, and the second displacement calculated at the second displacement detection processing unit 202. Thus, the optical encoder 1 according to the present embodiment can detect a given rotational angle over the entire circumference of 0 through 360 degrees from the output signals of the first displacement processing unit 201 and the second displacement processing unit 202.

Note that the algorithms of the above displacement detection processing and angle detection processing units are free from a particular method. As an example, there is a method wherein one signal of the two phases of approximate sine-wave signals is taken as A, the other signal is taken as B, and the rotational angle θ is computed by computing θ=tan$^{-1}$ (B/A). Such algorithm will be hereinafter referred to as interpolation division processing.

Figure 10:
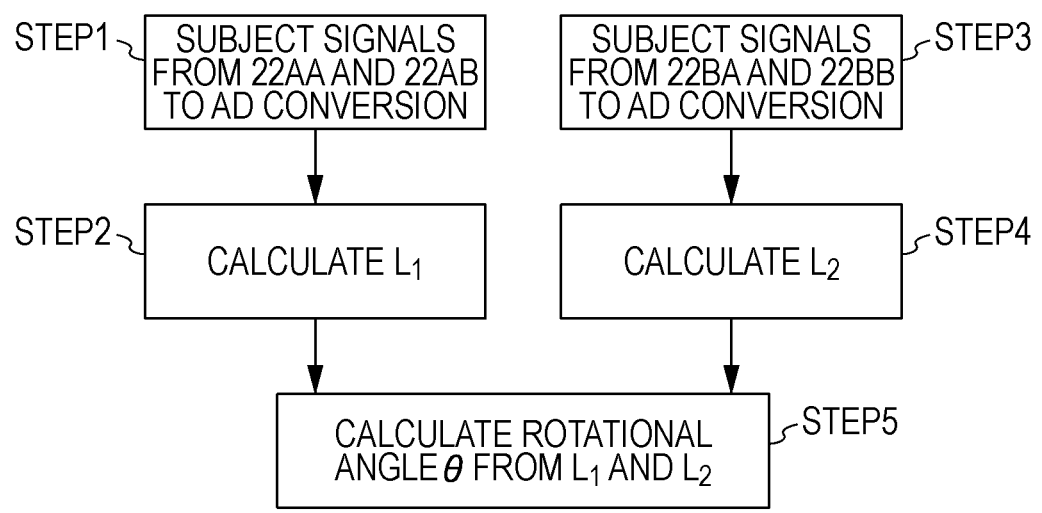
FIG. 10 is a flowchart illustrating steps of signal processing according to the first embodiment.

Next, steps of signal processing for detecting a rotational angle will be described. FIG. 10 is a flowchart illustrating the steps of the signal processing.

1) In step 1, two phases of approximate sine-wave signals having a different phase from the A-phase light reception unit 22AA and the B-phase light reception unit 22AB of the first light reception element 22A generated according to an overlapped state between the first annular slit 25A and the first fixed slit 21A are subjected to AD conversion at the AD conversion element 181 to obtain digital signals.

2) In step 2, based on the two digital signals converted in step 1, distance $L_1$ is computed at the first displacement detection processing unit 201.

3) In step 3, two phases of approximate sine-wave signals having a different phase from the A-phase light reception unit 22BA and the B-phase light reception unit 22BB of the second light reception element 22B generated according to an overlapped state between the second annular slit 25B and the second fixed slit 21B are subjected to AD conversion at the AD conversion element 182 to obtain digital signals.

4) In step 4, based on the two digital signals converted in step 3, distance $L_2$ is computed at the second displacement detection processing unit 202.

5) In step 5, based on L1 and L2 obtained in step 2 and step 4, the rotational angle θ is obtained from Expressions (1) through (4) and the like at the angle detection processing unit 210.

Note that either step 1 or 3 may be executed first, and either step 2 or 4 may be executed first. Alternatively, these steps may be processed simultaneously in parallel.

Figure 11:
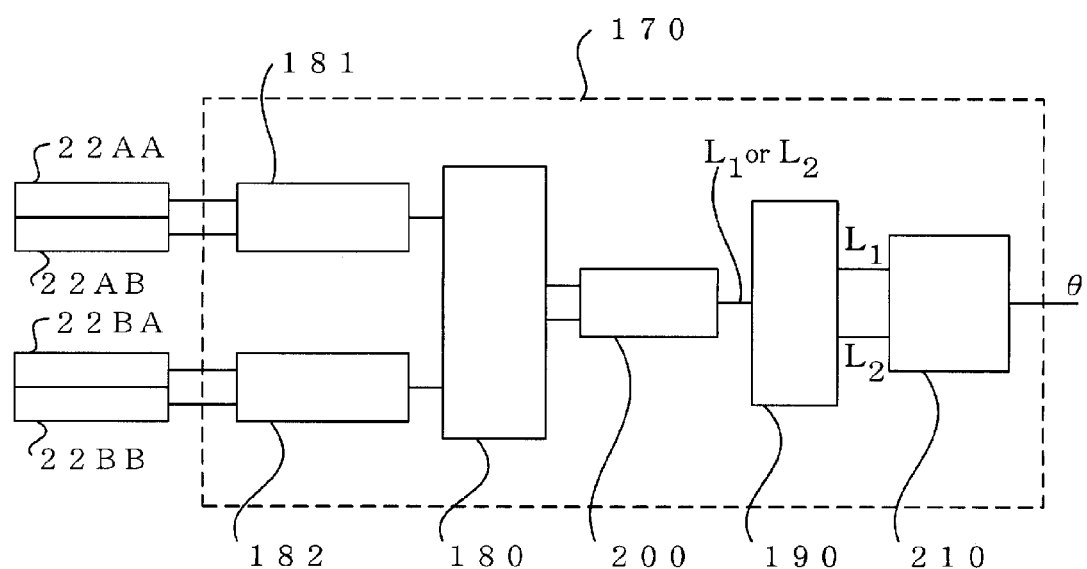
FIG. 11 is a block diagram illustrating a second example of the signal processing device of the optical encoder according to the first embodiment.

Next, another example of the signal processing device according to the present embodiment will be described. FIG. 11 is a block diagram illustrating a second example of the signal processing device of the optical encoder according to the present embodiment, and is an example wherein, with the signal processing device shown in the first example, the first displacement detection processing unit 201 and the second displacement detection processing unit 202 are a single displacement detection processing unit.

The signal processing device 170 according to this example includes, such as shown in FIG. 11, AD conversion elements 181 and 182, a switchover switch 180, a displacement detection processing unit 200, a storage unit 190, and an angle detecting unit 210.

The displacement detection processing unit 200 may be configured in the same way as the displacement detection processing units 201 and 202, but the switchover switch 180 is provided before and after the displacement detection processing unit 200. The switchover switch 180 switches a case where the signal from the AD conversion element 181 is input to the displacement detection processing unit 200, and a case where the signal from the AD conversion element 182 is input thereto. As a result thereof, the digital signal to be input to the displacement detection processing unit 200 is selected.

On the other hand, the storage unit 190 is provided downstream of the displacement detection processing unit 200, which stores the calculation result of the distance $L_1$ in the case that the signal from the AD conversion element 181 is input to the displacement detection processing unit, and the calculation result of the distance $L_2$ in the case that the signal from the AD conversion element 182 is input thereto.

The angle detection processing unit 210 detects the rotational angle θ by executing interpolation division processing based on the calculation at the first displacement detection processing unit 201, or the first displacement temporarily stored in the storage unit 190, and the calculation at the second displacement detection processing unit 202, or the second displacement temporarily stored in the storage unit 190.

Figure 12:
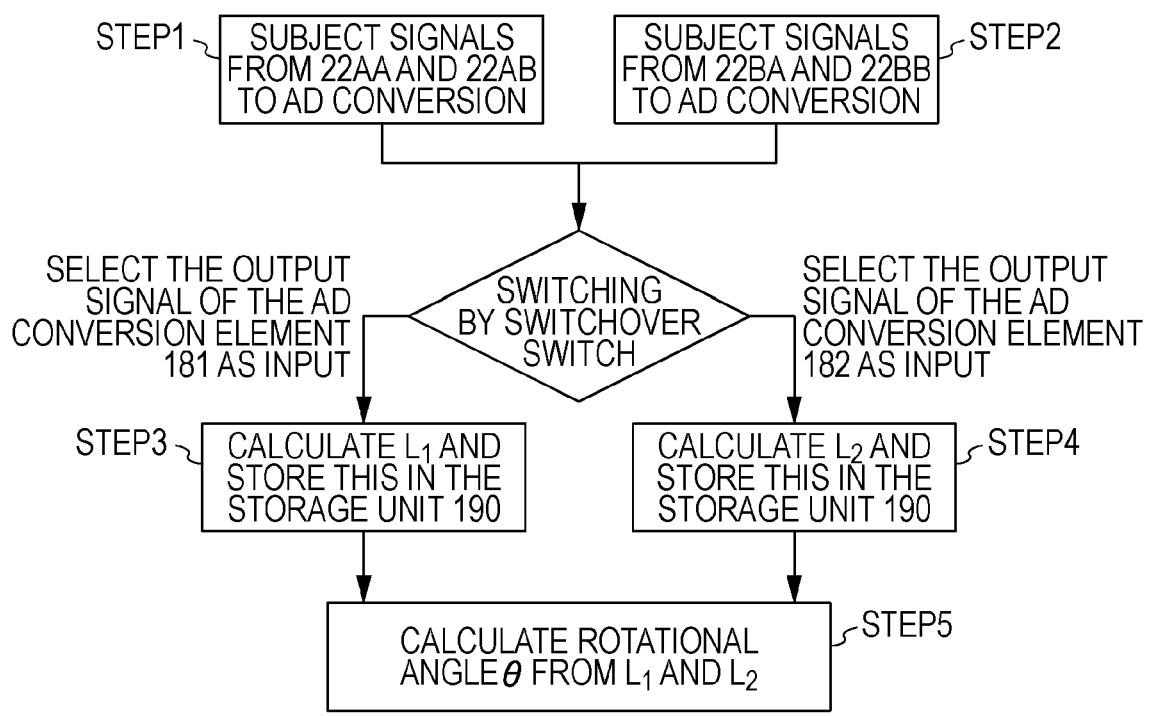
FIG. 12 is a flowchart illustrating steps of signal processing according to the first embodiment.

Next, steps of signal processing for detecting a rotational angle will be described. FIG. 12 is a flowchart illustrating the steps of the signal processing.

1) In step 1, two phases of approximate sine-wave signals having a different phase from the A-phase light reception unit 22AA and the B-phase light reception unit 22AB of the first light reception element 22A generated according to an overlapped state between the first annular slit 25A and the first fixed slit 21A are subjected to AD conversion at the AD conversion element 181 to obtain digital signals.

2) In step 2, two phases of approximate sine-wave signals having a different phase from the A-phase light reception unit 22BA and the B-phase light reception unit 22BB of the second light reception element 22B generated according to an overlapped state between the second annular slit 25B and the second fixed slit 21B are subjected to AD conversion at the AD conversion element 182 to obtain digital signals.

3) In step 3, in response to the switchover signal from an upper control unit (not shown), upon the switchover switch 180 selecting the two digital signals converted in step 1 as the input of the displacement detection processing unit 200, the displacement detection processing unit 200 computes the distance $L_1$, and stores this in the storage unit 190.

4) In step 4, in response to the switchover signal from the upper control unit, upon the switchover switch 180 selecting the two digital signals converted in step 2 as the input of the displacement detection processing unit 200, the displacement detection processing unit 200 computes the distance $L_2$, and stores this in the storage unit 190.

5) In step 5, based on $L_1$ and $L_2$ stored in step 3 and step 4, the rotational angle θ is obtained from Expressions (1) through (4) and the like at the angle detection processing unit 210.

Note that either step 1 or 2 may be executed first, or may be processed simultaneously in parallel.

Figure 13:
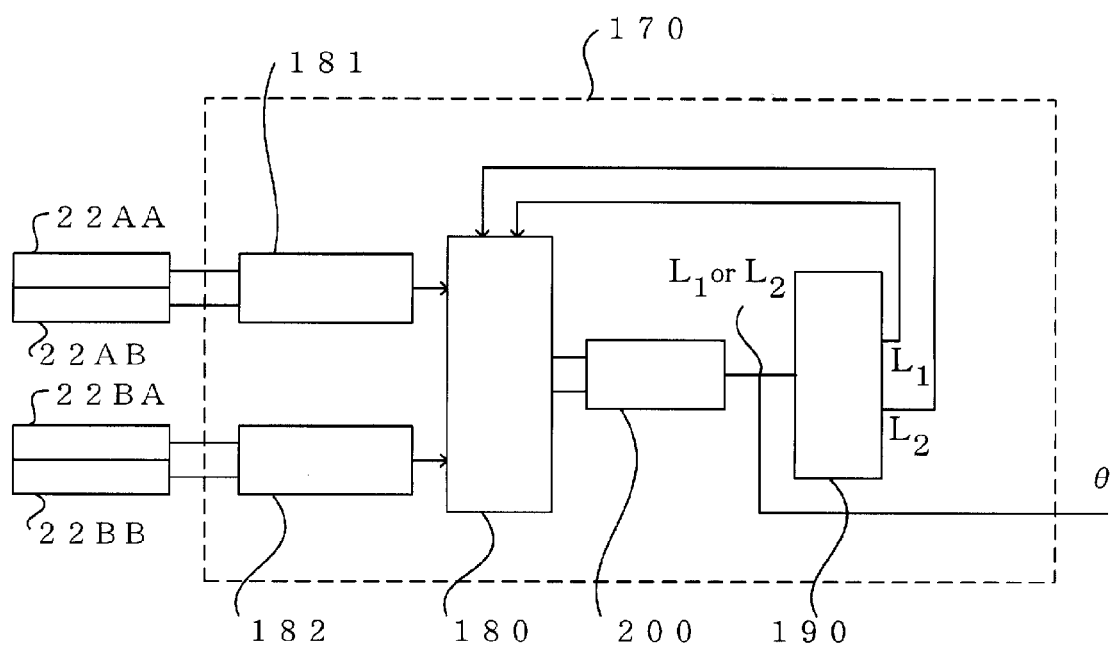
FIG. 13 is a block diagram illustrating a third example of the signal processing device of the optical encoder according to the first embodiment.

Next, yet another example of the signal processing device according to the present embodiment will be described. FIG. 13 is a block diagram illustrating a third example of the signal processing device of the optical encoder according to the present embodiment, and is an example wherein a single unit is used for the displacement detection processing unit 200 and the angle detection processing unit 210 of the signal processing device shown in the first example.

The signal processing device 170 according to this example includes, such as shown in FIG. 13, AD conversion elements 181 and 182, a switchover switch 180, a displacement detection processing unit 200, and a storage unit 190.

With this example as well, the switchover switch 180 is provided upstream from the displacement detection processing unit 200. On the other hand, the switchover switch 180 according to the present example switches three cases of a case where the signals digitized from the two phases of approximate sine-wave signals having a different phase from the A-phase light reception unit 22AA and the B-phase light reception unit 22AB of the first light reception element 22A generated according to an overlapped state between the first annular slit 25A and the first fixed slit 21A at the AD conversion element 181 are input to the displacement detection processing unit 200, a case where the signals digitized from the two phases of approximate sine-wave signals having a different phase from the A-phase light reception unit 22BA and the B-phase light reception unit 22BB of the second light reception element 22B generated according to an overlapped state between the second annular slit 25B and the second fixed slit 21B at the AD conversion element 182 are input to the displacement detection processing unit 200, and a case where $L_1$ and $L_2$ that are the calculation results of the above two cases are input to displacement detection processing unit 200. Thus, the signals to be input to the displacement detection processing unit 200 are selected.

Unlike the above example, the storage unit 190 is provided downstream from the displacement detection processing unit 200. The storage unit 190 stores the calculation result of the distance $L_1$ in the case that the signals digitized at the AD conversion element 181 are input, and the calculation result of the distance $L_2$ in the case that the signals digitized at the AD conversion element 182 are input.

Figure 14:
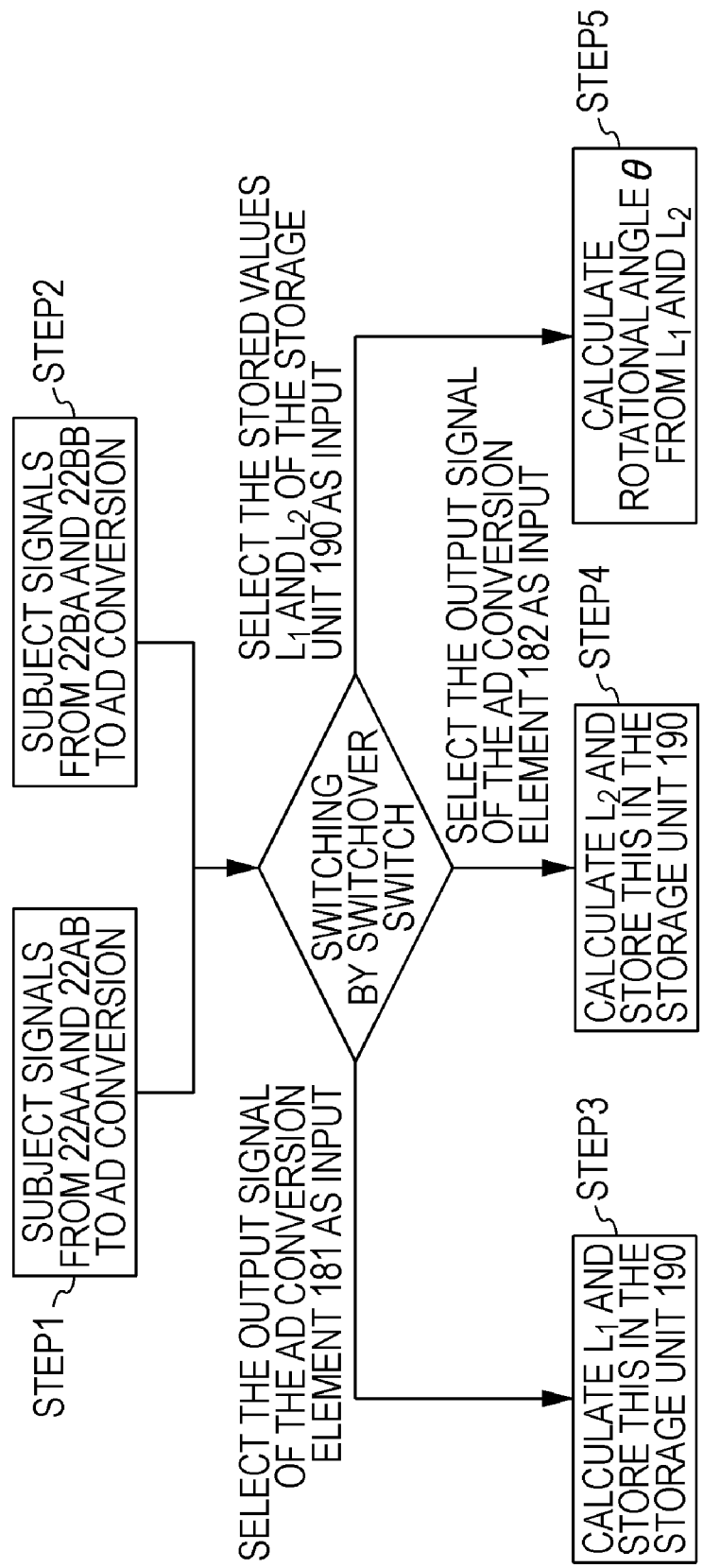
FIG. 14 is a flowchart illustrating steps of signal processing according to the first embodiment.

Next, steps of signal processing for detecting a rotational angle will be described. FIG. 14 is a flowchart illustrating the steps of the signal processing.

1) In step 1, two phases of approximate sine-wave signals having a different phase from the A-phase light reception unit 22AA and the B-phase light reception unit 22AB of the first light reception element 22A generated according to an overlapped state between the first annular slit 25A and the first fixed slit 21A are subjected to AD conversion at the AD conversion element 181 to obtain digital signals.

2) In step 2, two phases of approximate sine-wave signals having a different phase from the A-phase light reception unit 22BA and the B-phase light reception unit 22BB of the second light reception element 22B generated according to an overlapped state between the second annular slit 25B and the second fixed slit 21B are subjected to AD conversion at the AD conversion element 182 to obtain digital signals.

3) In step 3, in response to the switchover signal from an upper control unit (not shown), upon the switchover switch 180 selecting the two digital signals converted in step 1 as the input of the displacement detection processing unit 200, the displacement detection processing unit 200 computes the distance $L_1$, and stores this in the storage unit 190.

4) In step 4, in response to the switchover signal from the upper control unit, upon the switchover switch 180 selecting the two digital signals converted in step 2 as the input of the displacement detection processing unit 200, the displacement detection processing unit 200 computes the distance $L_2$, and stores this in the storage unit 190.

5) In step 5, in response to the switchover signal from the upper control unit, upon the switchover switch 180 selecting $L_1$ and $L_2$ stored in step 3 and step 4 as the input of the displacement detection processing unit 200, the displacement detection processing unit 200 obtains the rotational angle θ from Expressions (1) through (4).

Note that either step 1 or 2 may be executed first, or, steps 1 and 2 may be processed simultaneously in parallel.

Also, particularly, the slit pitches of the first annular slit 25A and the first fixed slit 21A, and the slit pitches of the second annular slit 25B and the second fixed slit 21B are set greater than the decentered amounts d1 and d2 of the corresponding annular slit, position relationship of opening portions of the first annular slit 25A and the first fixed slit 21A, and position relationship of opening portions of the second annular slit 25B and the second fixed slit 21B are determined uniquely, and the absolute value of the rotational angle is calculated from the displacement of the annular slit 25. For example, if we say that the decentered amount as to the rotation axis of the annular slit 25 is 40 μm, the slit pitches of the annular slit 25, the first fixed slit 21A, and the second fixed slit 21B should be set to 50 μm.

Thus, with the present embodiment, the first annular slit having multiple concentric slits decentered as to the center of the rotation disc, and the second annular slit having multiple concentric slits decentered in a direction different from the first annular slit are formed on the rotation disc, whereby a given angle can be detected over the entire circumference, 0 through 360 degrees, and also the first detecting unit and the second detecting unit can be detected in adjacent positions, and accordingly, a small optical encoder can be realized.

Second Embodiment

Configuration of Second Embodiment

Figure 15:
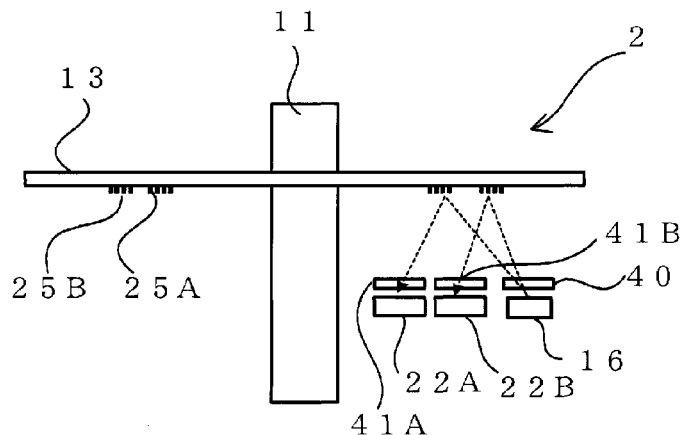
FIG. 15 is a side view of the optical encoder illustrating a second embodiment of the present invention.

FIG. 15 is a side view of an optical encoder illustrating a second embodiment of the present invention. The principal difference as to the first embodiment is in that the second embodiment has the configuration of a reflection type optical system to which three-grid principle has been applied. Note that the signal processing unit 17 according to the present embodiment may be configured in the same way as with the first embodiment and the following third embodiment, and accordingly, is omitted for convenience of explanation.

With the optical encoder 2 according to the present embodiment, a light source 16 is disposed on the same face side as with the first light reception element 22A and the second light reception element 22B of the rotation disc 13, a light source slit 40 is disposed on the optical path of the light source 16, and a first index slit 41A and a second index slit 41B (each as an example of a fixed slit of a three-grid optical system) are disposed instead of the first fixed slit 21A and the second fixed slit 21B.

That is to say, the light source slit 40 is disposed in front of the light source 16, three grids are formed of the light source slit 40, first annular slit 25A, and first index slit 41A. Similarly, three grids are also formed of the light source 40, second annular slit 25B, and second index slit 41B.

As described above, with each embodiment according to the present invention, multiple equal-pitched concentric slit patterns are used for the annular slit, whereby an optical encoder to which the three-grid optical system has been applied can be realized by combining a fixed slit formed in an equal pitch and a light source slit formed in an equal pitch.

Figure 16:
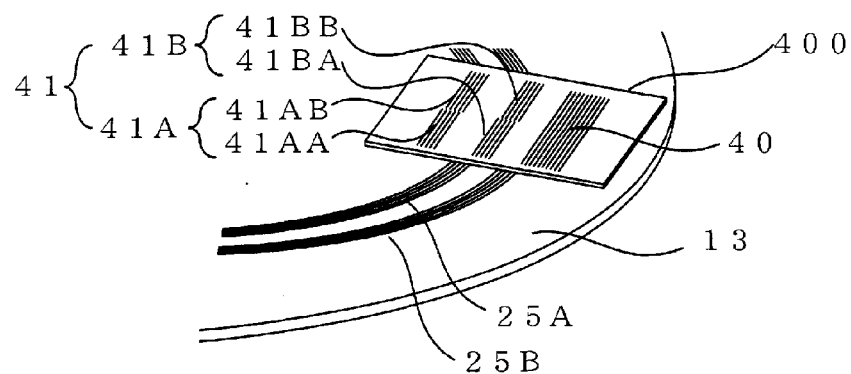
FIG. 16 is a perspective view illustrating the layout of a rotation disc, a light source slit, and an index slit, according to the second embodiment.
Figure 17:
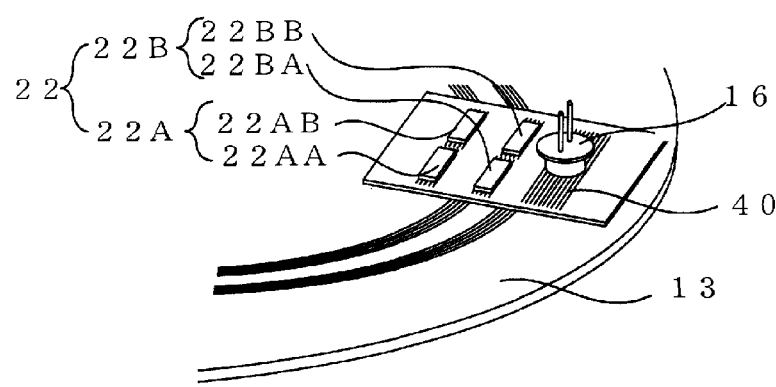
FIG. 17 is a perspective view displaying FIG. 16 by adding a light source and a light reception element thereto.

A specific configuration will be described with reference to the perspective views in FIGS. 16 and 17. FIG. 16 illustrates the layout of the rotation disc 13, light source slit 40, and index slit 41. FIG. 17 shows the arrangement in FIG. 16, while adding a light source 16 and a light reception element 22 thereto.

In order to detect the direction of the first annular slit displacement, the first index slit 41A is configured of an A-phase slit 41AA, and a B-phase slit 41AB of which the phases are shifted such as shown in FIG. 16. Corresponding to this, the first light reception element 22A is also divided into an A-phase light reception unit 22AA and a B-phase light reception unit 22AB such as shown in FIG. 17. Similarly, the second index slit 41B is also formed of an A-phase slit 41BA and a B-phase slit 41BB of which the phases are shifted, and the second light reception element 22B is also divided into an A-phase light reception unit 22BA and a B-phase light reception unit 22BB.

Note that the light source slit 40, the A-phase slit 41AA and the B-phase slit 41AB of the first index slit, and the A-phase slit 41BA and the B-phase slit 41BB of the second index slit may be formed on the same substrate shown in 400. Also, the index slit is not formed on the same substrate as the light source slit 40, and a slit-pattern-shaped light reception element where a slit is formed with the same pitch as the annular slit is used, whereby the index slit can also be omitted.

Also, with the first annular slit 25A and the second annular slit 25B, a portion where the light from the light source 16 is irradiated, which is contributed to detection, is locally regarded as a straight line, whereby the shapes of the light source slit and the index slit can both be created in a linear shape.

(Operation of Second Embodiment)

Next, operation will be described. According to the three-grid principle, an interference pattern is caused on the first index slit 41A due to light irradiated from the light source 16, passed through the light source slit 40, and reflected at the first annular slit 25A.

The first annular slit 25A is formed decentered as to the center 103 of the rotation disc 13, and accordingly, upon the rotation axis 11 rotating, the distance $L_1$ between the portion of the first annular slit 25A disposed in a position where the light from the light source 16 is irradiated, and the rotation center 100 of the rotation axis 11 is changed according to the rotational angle θ of the rotation axis 11. Therefore, the image of the interference pattern occurs on the index slit 41A is also changed subserviently. Accordingly, correlation between the image of this interference pattern and the opening portion of the first index slit 41A is detected at the first light reception element 22A, whereby the distance $L_1$ can be detected. Similarly, the distance $L_2$ of the second annular slit 25B disposed in a position where the light from the light source 16 is irradiated can also be detected. The values of the distance $L_1$ and the distance $L_2$ are used, whereby a given angle can be detected over the entire circumference of 0 through 360 degrees in the same way as with the first embodiment.

Thus, with the present embodiment, the optical system to which the three-grid principle has been applied is used, whereby an optical encoder which can handle gap fluctuation between the rotation disc and the fixed slit well, can be realized.

With the first embodiment, a case has been described wherein the rotation disc 13 is attached with high precision so that the center 103 of the rotation disc 13 is identical to the rotation center 100 of the rotation axis 11, but there is a case where in the event that the attachment precision of the rotation disc 13 is poor, the center 103 of the rotation disc 13 deviates from the rotation center 100 of the rotation axis 11. Before describing the third embodiment, first, a problem in the case that the attachment precision of the rotation disc 13 is poor will be described with reference to FIG. 18.

Figure 18:
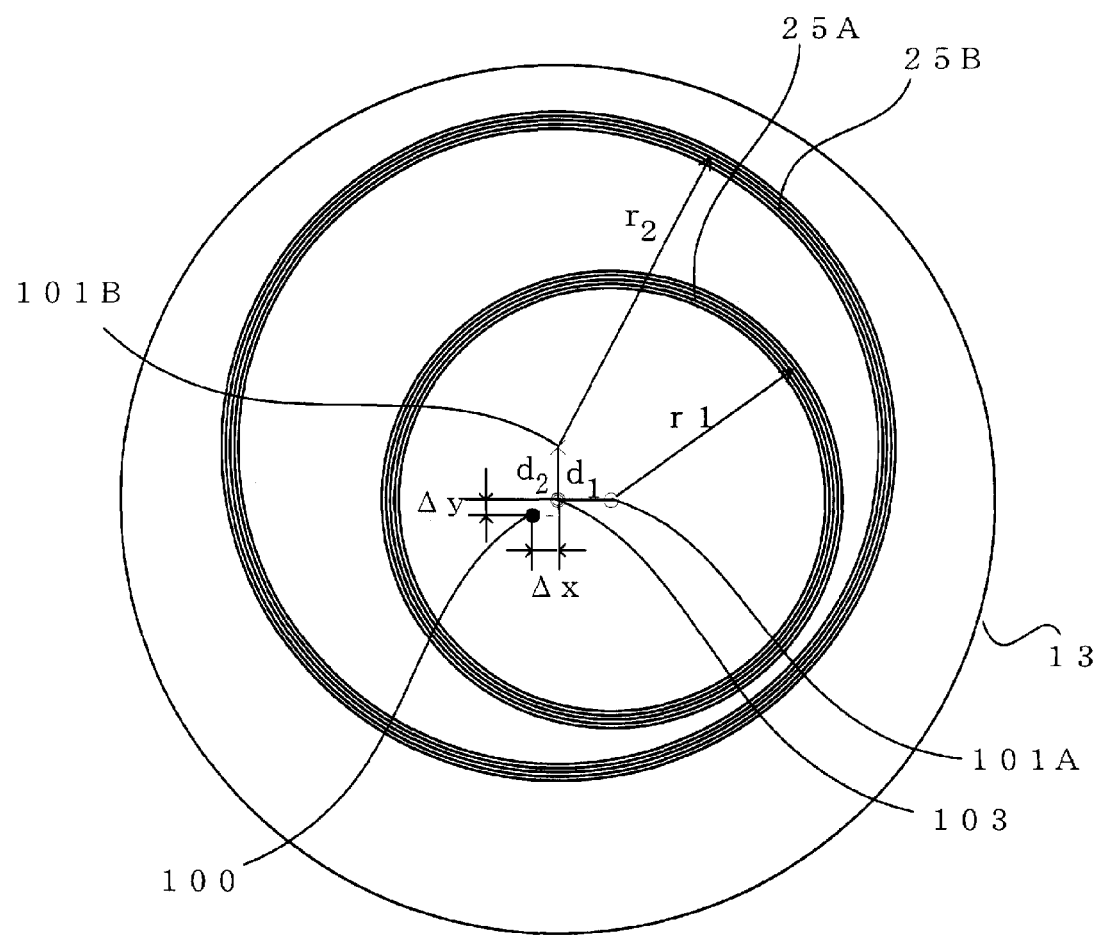
FIG. 18 is a plan view illustrating the state of the rotation disc in the case that the rotation disc is attached so that the center of the rotation disc is decentered as to the rotation center.
Figure 19:
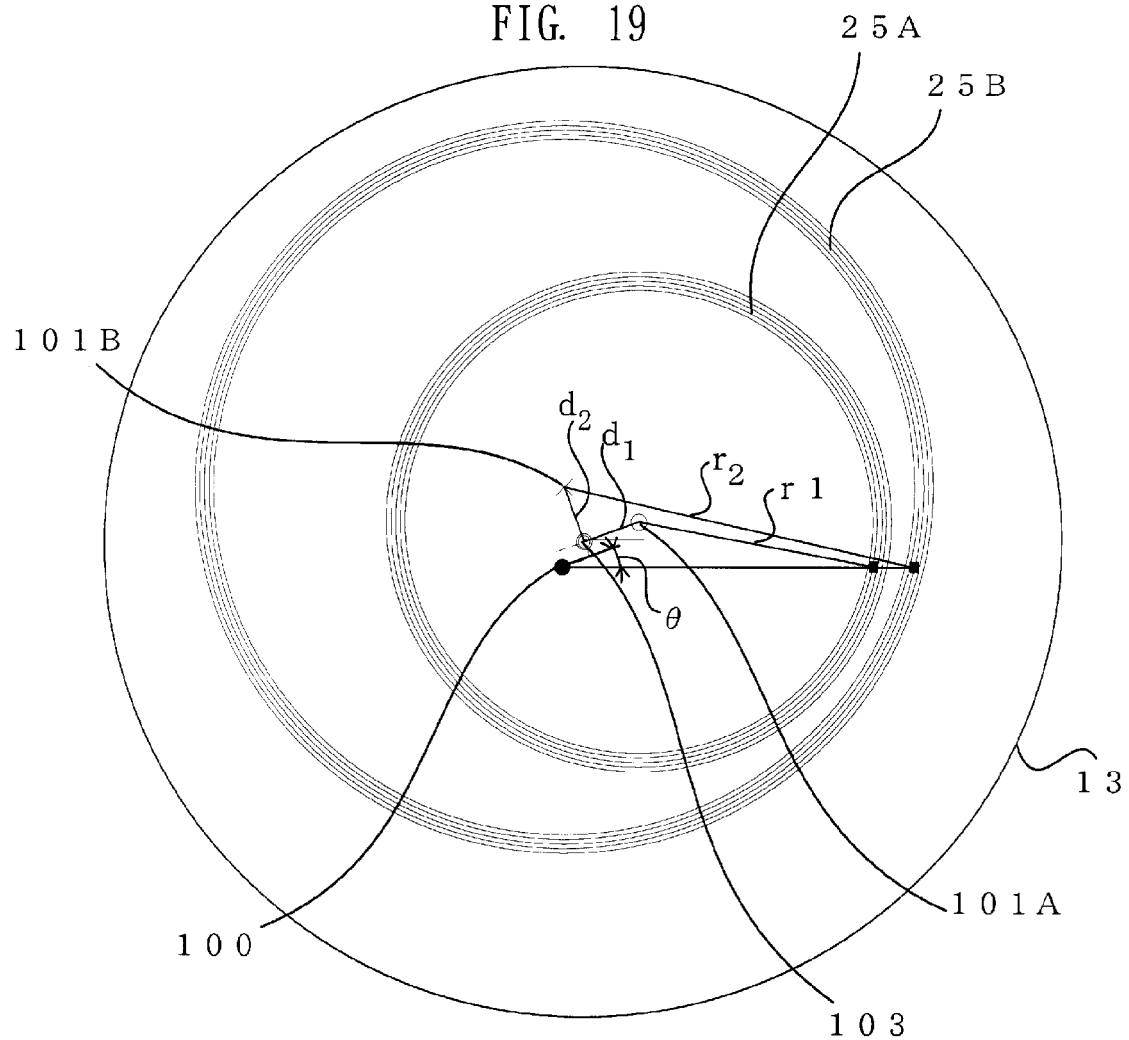
FIG. 19 is a plan view illustrating the state of the rotation disc in the case of rotating the rotation disc by the rotational angle θ from the position in FIG. 18.

FIG. 18 is a plan view illustrating the state of the rotation disc in the case that the rotation disc is attached with the rotation center of the rotation disc deviating from the rotation center. FIG. 18 illustrates a state in the case that the rotation disc 13 is attached with the center 103 of the rotation disc 13 deviating from the rotation center 100 of the rotation axis 11 Δx in the X direction and Δy in the Y direction. Also, FIG. 19 is a plan view illustrating the state of the rotation disc in the case that the rotation disc being rotated by the rotational angle θ from the position in FIG. 18, and FIG. 20 is a principal portion enlarged view of FIG. 19.

Figure 20:
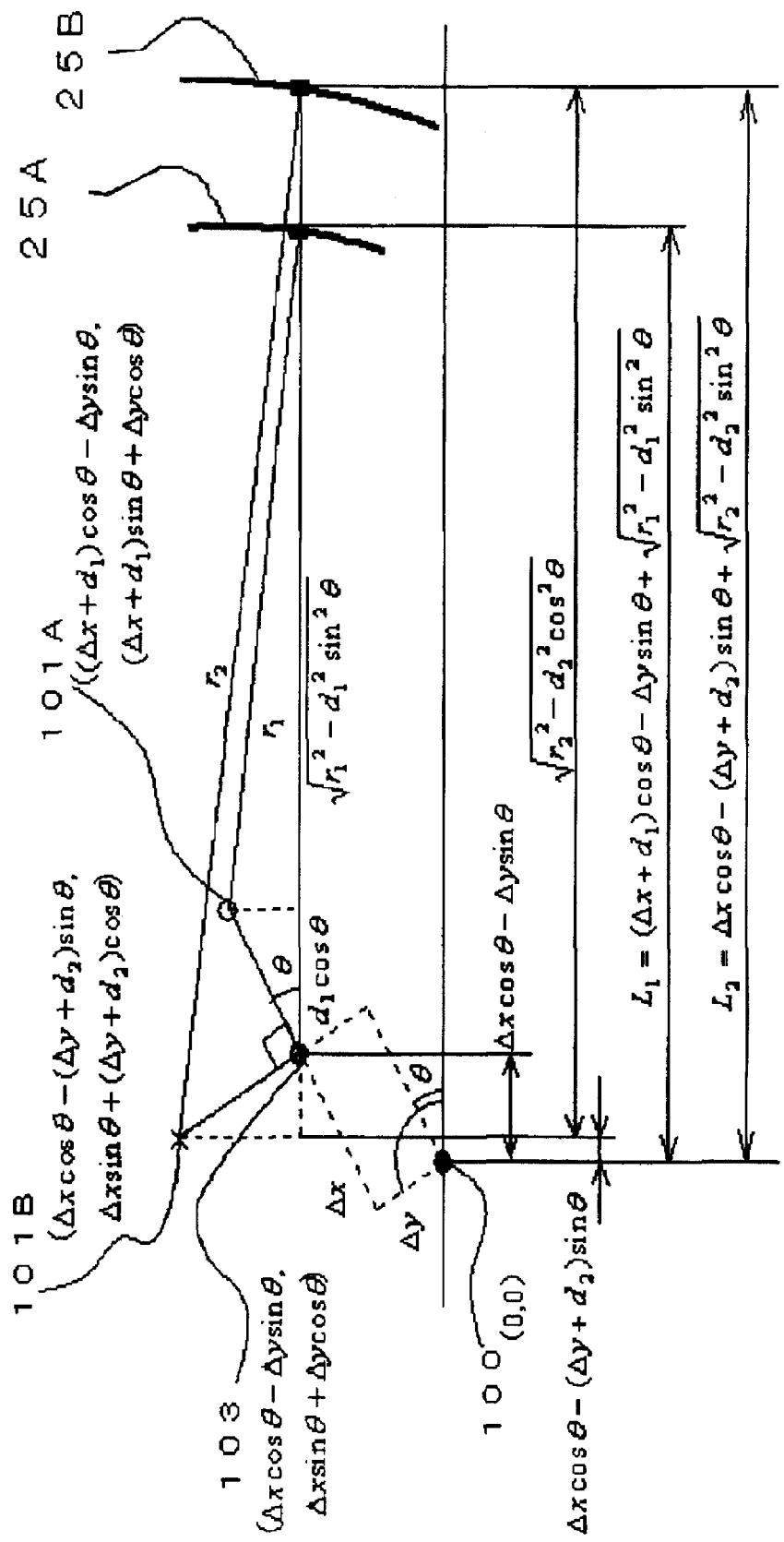
FIG. 20 is a principal portion enlarged view of FIG. 19.

In FIG. 20, the distance $L_1$ from the rotation center 100 to the annular slit 25A of the detecting unit corresponding to the first fixed slit 21A is represented as follows such as shown in the drawing.

$$L_1 = (\Delta x + d_1)\cos\theta - \Delta y \sin\theta + (r_1^2 - d_1^2 \cdot \sin^2\theta)^{1/2} \tag{5}$$

When $d_1$ is sufficiently small as compared to $r_1$, this expression is approximated as follows.

$$L_1 \cong (\Delta x + d_1)\cos\theta - \Delta y \sin\theta + r_1 \tag{6}$$

Similarly, the distance $L_2$ from the rotation center 100 to the annular slit 25B of the detecting unit corresponding to the second fixed slit 21B is represented as follows such as shown in the drawing.

$$L_2 = \Delta x \cos\theta - (\Delta y + d_2)\sin\theta + (r_2^2 - d_2^2 \cdot \sin^2\theta)^{1/2} \tag{7}$$

When $d_2$ is sufficiently small as compared to $r_2$, this expression is approximated as follows.

$$L_2 \cong \Delta x \cos\theta - (\Delta y + d_2)\sin\theta + r_2 \tag{8}$$

Comparing Expression (6) and Expression (2), it can be found that the amplitude of $L_1$ is changed according to shift Δx in the X direction between the center 103 of the rotation disc 13, and the rotation center 100 of the rotation axis 11, and the phase of $L_1$ is changed according to shift Δy in the Y direction. Similarly, comparing Expression (8) and Expression (4), it can be found that the amplitude of $L_2$ is changed according to shift Δx in the X direction between the center 103 of the rotation disc 13, and the rotation center 100 of the rotation axis 11, and the phase of $L_2$ is changed according to shift Δy in the Y direction.

For example, in the case that Δx=−$d_1$ and Δy=0, $$L_1 \cong r_1 \tag{9}$$

holds, and accordingly, even if the rotation disc 13 is rotated, the distance $L_1$ is not changed.

Thus, with the encoder according to the first embodiment, there has been a case where in the event that the attachment precision of the rotation disc 13 is poor, the center 103 of the rotation disc 13 deviates from the rotation center 100 of the rotation axis 11, and consequently, the distance $L_1$ from the rotation center 100 to the annular slit 25A of the detecting unit corresponding to the first fixed slit 21A, and the distance $L_2$ from the rotation center 100 to the annular slit 25B are not readily accurately detected.

Third Embodiment

Configuration of Third Embodiment

Figure 21:
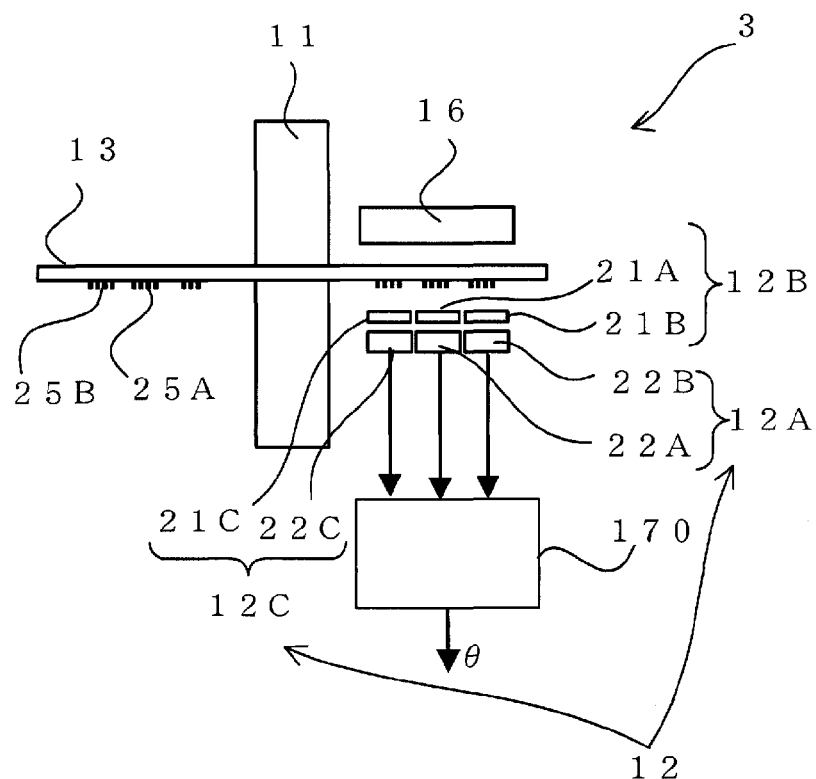
FIG. 21 is a side view of an optical encoder illustrating a third embodiment of the present invention.
Figure 22:
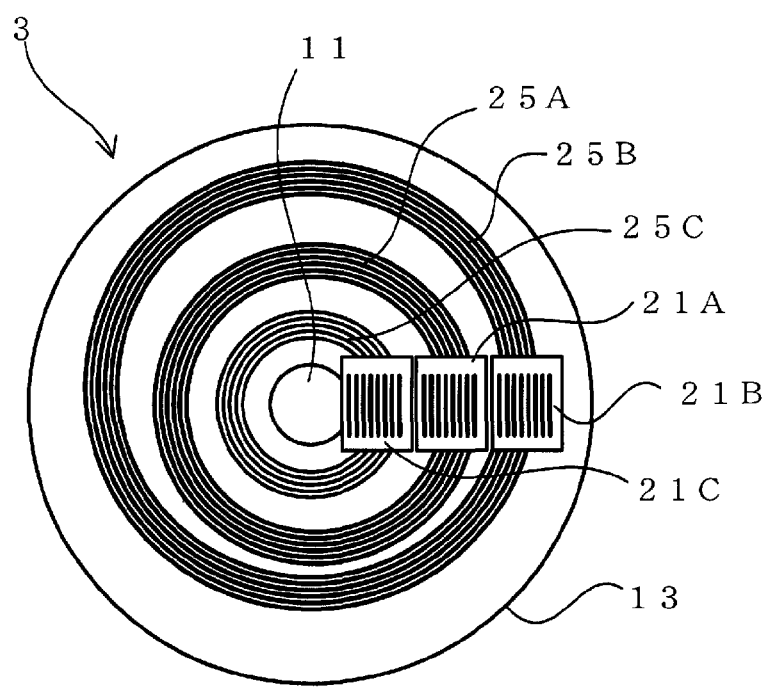
FIG. 22 is a plan view of the optical encoder according to the third embodiment.

FIG. 21 is a side view of an optical encoder illustrating a third embodiment of the present invention, and FIG. 22 is a plan view. The present embodiment can solve the above problem. Note that the plan view in FIG. 22 is a view viewing FIG. 21 from below in the drawing. The same components as those of the encoder according to the first embodiment will be denoted with the same reference numbers, and description thereof will be omitted.

An optical encoder 3 according to the present embodiment includes, such as shown in FIG. 21, a third annular slit 25C and a third detecting unit 12C in addition to the configuration of the encoder 1 according to the first embodiment.

The third annular slit 25C includes multiple concentric slit patterns in the same way as with the first annular slit 25A and the second annular slit 25B. On the other hand, this third annular slit 25C is formed so that the center of the concentric circle becomes the center of the rotation disc. The third detecting unit 12C is provided to a fixed member (not shown) corresponding to the third annular slit 25C.

The third detecting unit 12C includes, such as shown in FIG. 21, a third fixed slit 21C, and a third light reception element 22C. That is to say, a point where the present embodiment differs from the first embodiment is in that a third annular slit is formed on the rotation disc, and a third fixed slit and a third light reception element making up an optical system corresponding thereto are added.

In the same way as with the first fixed slit 21A and the first light reception element 22A, and the second fixed slit 21B and the second light reception element 22B, with the third fixed slit 21C, an A-phase slit group 21CA, and a B-phase slit group 21CB which have a mutually different phase are formed, and the third light reception element 22C is divided into two, namely, an A-phase light reception unit 22CA and a B-phase light reception unit 22CB.

The third fixed slit 21C and the third light reception element 22C may be configured integrally. Also, as the light source 16 separate elements may be used for the first annular slit 25A, for the second annular slit 25B, and for the third annular slit 25C, respectively.

Figure 23:
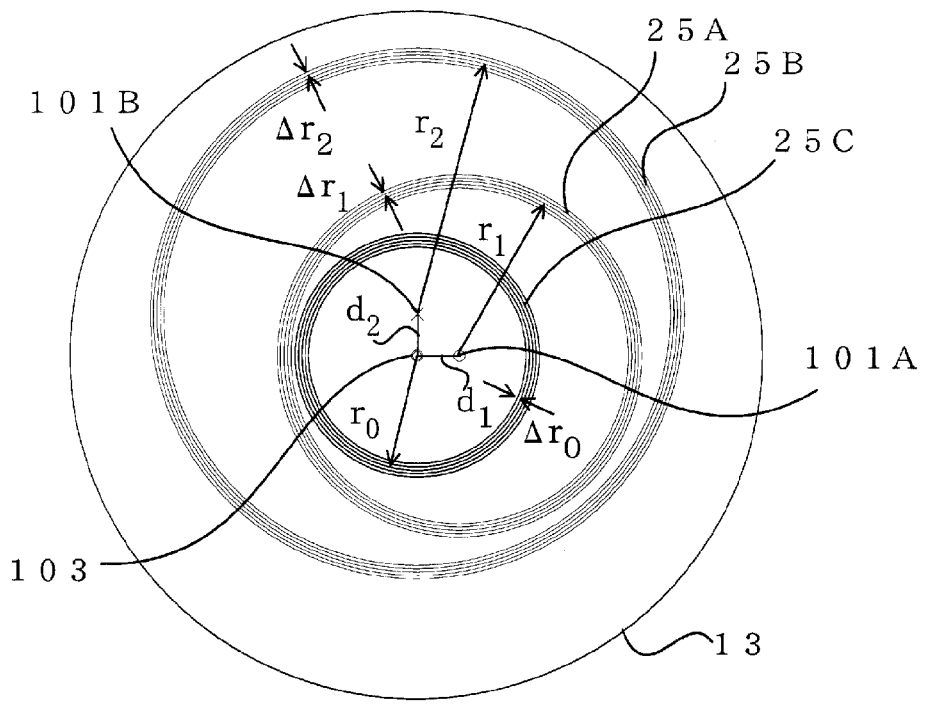
FIG. 23 is a plan view illustrating pattern examples of an annular slit according to the third embodiment.

FIG. 23, which is a plan view illustrating pattern examples of the annular slit, illustrates a formation pattern example of the first annular slit 25A, second annular slit 25B, and third annular slit 25C which are formed on the rotation disc 13.

The first annular slit 25A is formed of multiple (five in the drawing) concentric slits of which the radiuses differ in increments of $\Delta r_1$ with the circle having a radius $r_1$ as the middle with point 101A decentered by distance $d_1$ in the x-axis direction as to the center 103 of the rotation disc 13 as the center. The second annular slit 25B is formed of multiple (five in the drawing) concentric slits of which the radiuses differ in increments of $\Delta r_2$ with the circle having a radius $r_2$ as the middle with point 101B decentered by distance $d_2$ in the y-axis direction as to the center 103 of the rotation disc 13 as the center. The third annular slit 25C is formed of multiple (five in the drawing) concentric slits of which the radiuses differ in increments of $\Delta r_0$ with the circle having a radius $r_0$ as the middle with the center 103 of the rotation disc 13 as the center.

Now, let us consider a case where the rotation disc 13 is attached with the center 103 of the rotation disc 13 deviating from the rotation center 100 of the rotation axis 11 $\Delta x$ in the X direction and $\Delta y$ in the Y direction due to attachment error in the same way as shown in FIG. 18.

Figure 24:
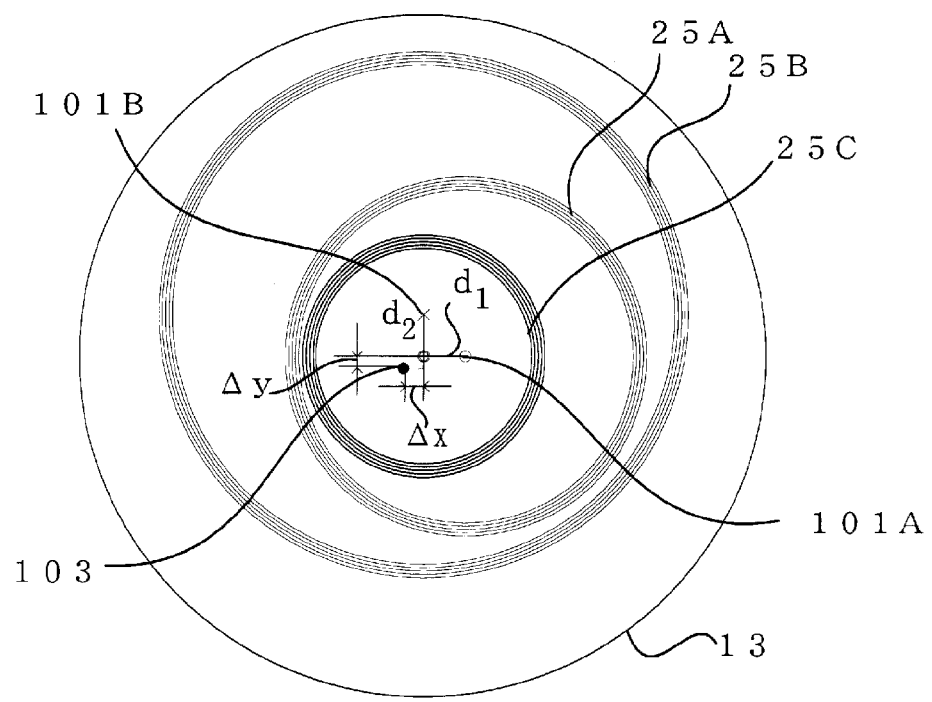
FIG. 24 is a plan view illustrating the state of the rotation disc in the case that the rotation disc is attached so that the center of the rotation disc is decentered as to the rotation center, with the third embodiment.
Figure 25:
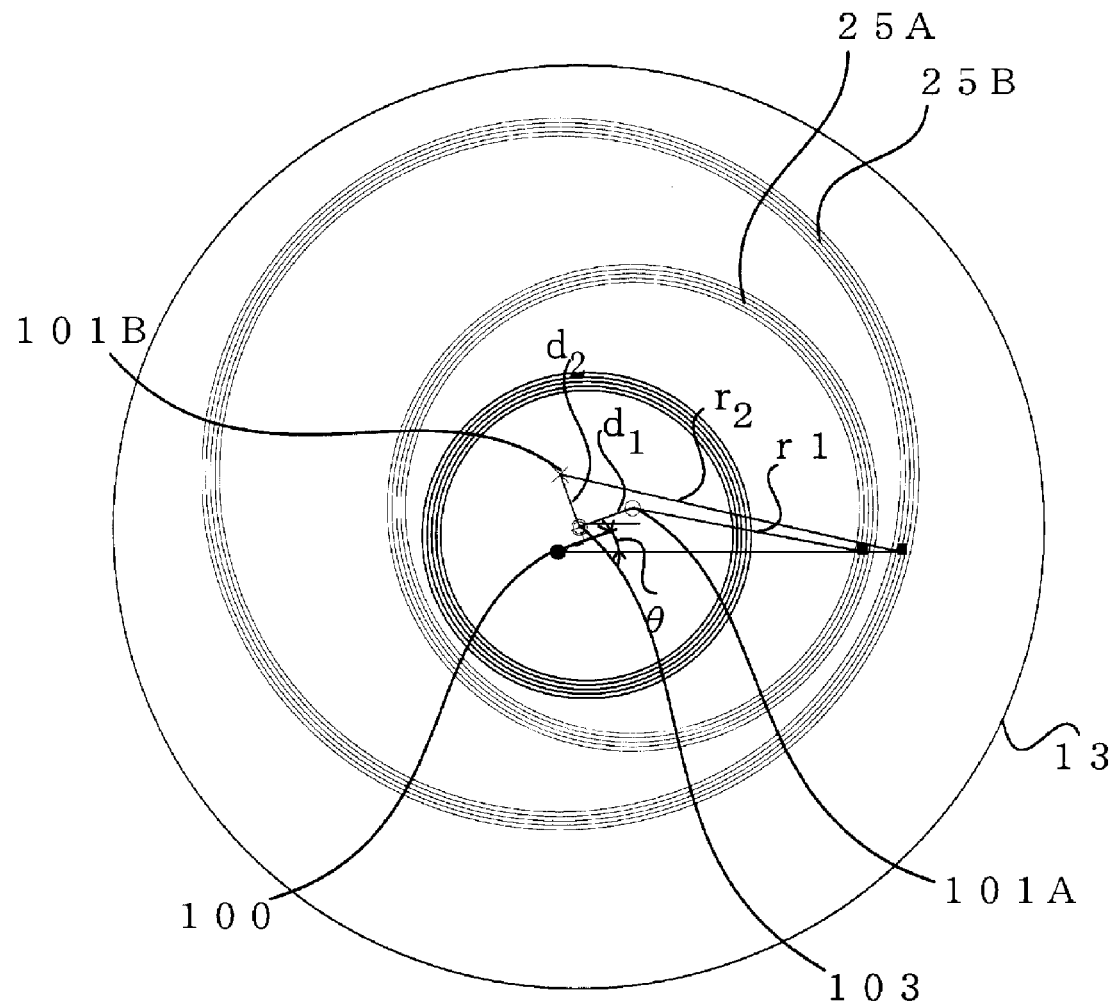
FIG. 25 is a plan view illustrating a state when rotating the rotation disc by the rotational angle θ from the state in FIG. 24.
Figure 26:
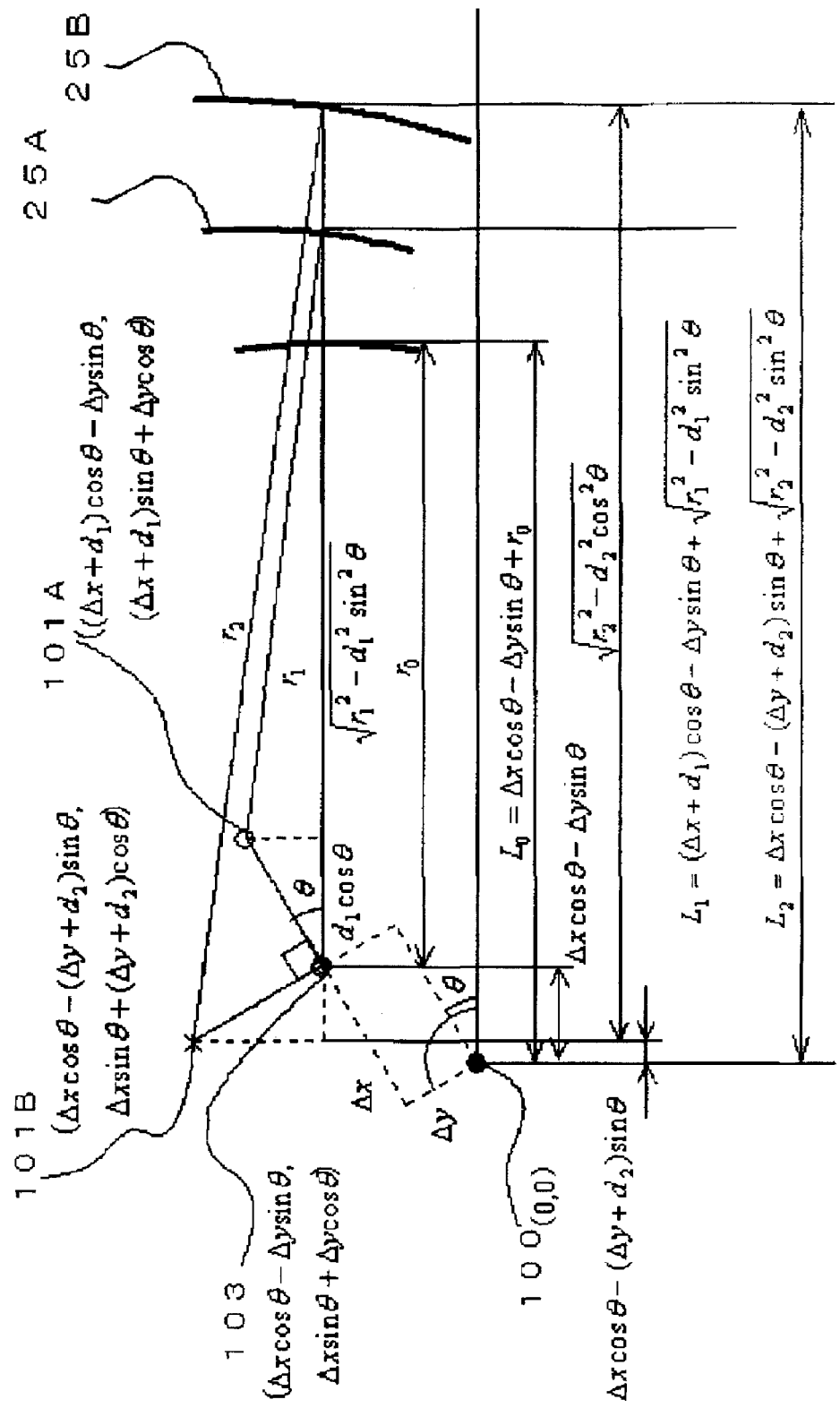
FIG. 26 is a principal portion enlarged view of FIG. 25.

FIG. 24 is a plan view illustrating the state of the rotation disc in the case that the rotation disc is attached with the center of the rotation disc deviating from the rotation center, and FIG. 25 is a plan view illustrating the state when the rotation disc is rotated by the rotational angle $\theta$ from the state in FIG. 24. Also, FIG. 26 is a principal portion enlarged view of FIG. 25.

As described above, the distance $L_1$ from the rotation center 100 to the annular slit 25A of the detecting unit corresponding to the first fixed slit 21A is represented with Expression (6), and the distance $L_2$ from the rotation center 100 to the annular slit 25B of the detecting unit corresponding to the second fixed slit 21B is represented with Expression (8).

On the other hand, distance $L_0$ from the rotation center 100 to the annular slit 25C of the detecting unit corresponding to the third fixed slit 21C is represented as follows from FIG. 26.

$$L_0 = \Delta x \cos \theta - \Delta y \sin \theta + r_0 \quad (10)$$

According to Expression (6)-Expression (10), the following relationship is derived.

$$L_1 - L_0 \approx L_0 \cong d_1 \cos \theta + r_1 - r_0 \quad (11)$$

According to Expression (8)-Expression (10), the following relationship is derived.

$$L_2 - L_0 \cong d_2 \sin \theta + r_2 - r_0 \quad (12)$$

With Expression (11) and Expression (12), terms of $\Delta x$ and $\Delta y$ due to deviation between the center 103 of the rotation disc 13, and the rotation center 100 of the rotation axis 11 are eliminated. Thus, the values of $L_1 - L_0$ and $L_2 - L_0$ indicate change in sine wave shapes having a different phase as to the rotational angle of 0 through 360 degrees without depending on attachment error. Accordingly, the values of $L_1 - L_0$ and $L_2 - L_0$ obtained from the three annular slits are used, and accordingly, relationship as to the rotational angle can be associated one-on-one, whereby a given rotational angle can be detected over the entire circumference of 0 through 360 degrees.

Note that the value of the distance $L_1$ can be calculated by executing interpolation signal processing based on two phases of signals from the A-phase light reception unit 22AA and the B-phase light reception unit 22AB of the first light reception element 22A generated due to an overlapped state between the first annular slit 25A and the first fixed slit 21A. Also, the value of the distance $L_2$ can be calculated by executing interpolation signal processing based on two phases of signals from the A-phase light reception unit 22BA and the B-phase light reception unit 22BB of the second light reception element 22B generated due to an overlapped state between the second annular slit 25B and the second fixed slit 21B.

Further, the value of the distance $L_0$ can be calculated by executing interpolation signal processing based on two phases of signals from the A-phase light reception unit 22CA and the B-phase light reception unit 22CB of the third light reception element 22C generated due to an overlapped state between the third annular slit 25C and the third fixed slit 21C.

Computations of $L_1 - L_0$ and $L_2 - L_0$ are executed based on the obtained distance $L_1$, distance $L_2$, and distance $L_0$ signals, and the rotational angle $\theta$ can be calculated by using further interpolation signal processing based on these two signals L1−L0 and L2−$L_0$.

(Signal Processing Unit of Third Embodiment)

Figure 27:
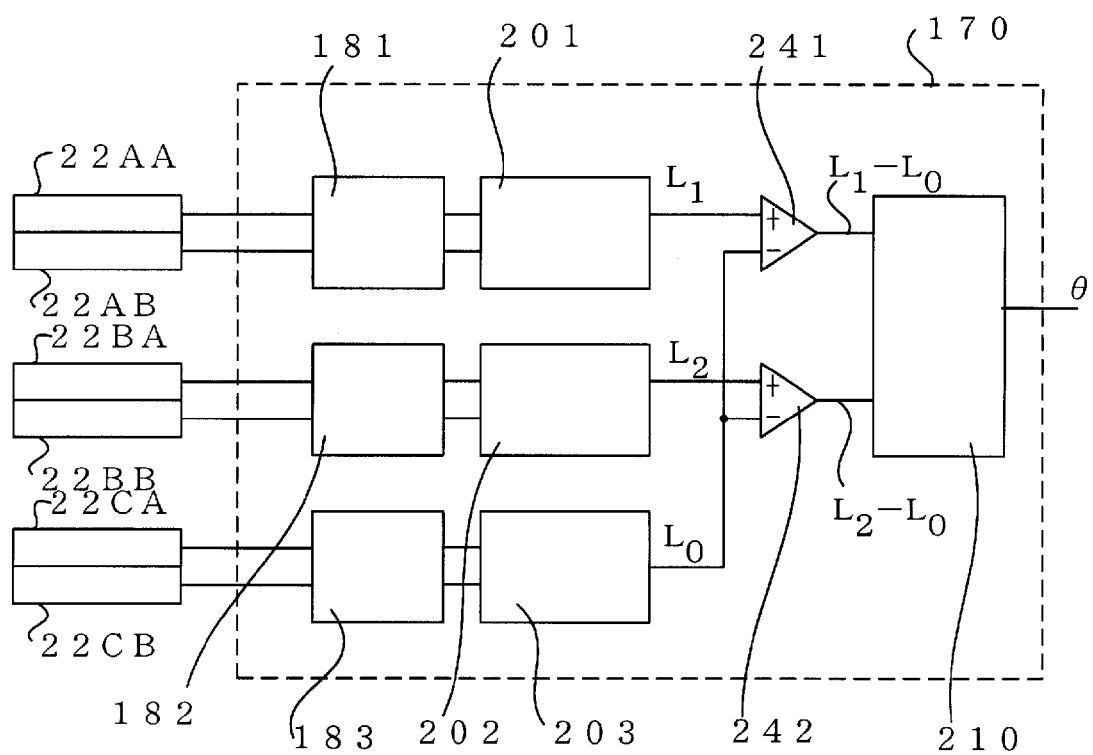
FIG. 27 is a block diagram illustrating a first example of a signal processing device of the optical encoder according to the third embodiment.

Next, a signal processing device for detecting a rotational angle will be described. FIG. 27 is a block diagram illustrating a first example of a signal processing device of the optical encoder according to the present embodiment. As shown in FIG. 27, the signal processing device 170 includes AD conversion elements 181 through 183, first through third displacement detection processing units 201 through 203, subtractors 241 and 242, and an angle detection processing unit 210.

In the same way as with the first embodiment, the AD conversion elements 181 and 182 subject two phases of sinewave signals from the first light reception element 22A and the second light reception element 22B to AD conversion. Also, the first displacement detection processing unit 201 calculates first displacement (distance $L_1$) that is displacement in the radial direction of the rotation axis of the first annular slit 25A based on the two phases of approximate sine-wave signals digitized at the AD conversion element 181. The second displacement detection processing unit 202 calculates second displacement (distance $L_2$) that is displacement in the radial direction of the rotation axis of the second annular slit 25B based on the two phases of approximate sine-wave signals digitized at the AD conversion element 182.

On the other hand, the AD conversion element 183 converts from analog to digital each of the two phases of approximate sine-wave signals having a different phase from the A-phase light reception unit 22CA and the B-phase light reception unit 22CB of the third light reception unit 22C generated due to an overlapped state between the third annular slit 25C and the third fixed slit 21C.

The third displacement detection processing unit 203 calculates distance $L_0$ by executing interpolation division processing based on the two phases of approximate sine-wave signals digitized at the AD conversion element 183.

The subtractor 241 obtains $L_1-L_0$ that is difference between the distance $L_1$ calculated at the first displacement detection processing unit 201, and the distance $L_0$ calculated at the third displacement detection processing unit 203. On the other hand, the subtractor 242 obtains $L_2-L_0$ that is difference between the distance $L_2$ calculated at the second displacement detection processing unit 202, and the distance $L_0$ calculated at the third displacement detection processing unit 203. Subsequently, the angle detection processing unit 210 detects the rotational angle θ from Expressions (11) and (12) based on the difference $L_1-L_0$ and the difference $L_2-L_0$.

Note that the algorithms of the above displacement detection processing and angle detection processing units are free from a particular method. As a simple example, there is a method wherein one signal is taken as A, the other signal is taken as B, and the rotational angle θ is computed by computing $\theta = \tan^{-1}(B/A)$.

Figure 28:
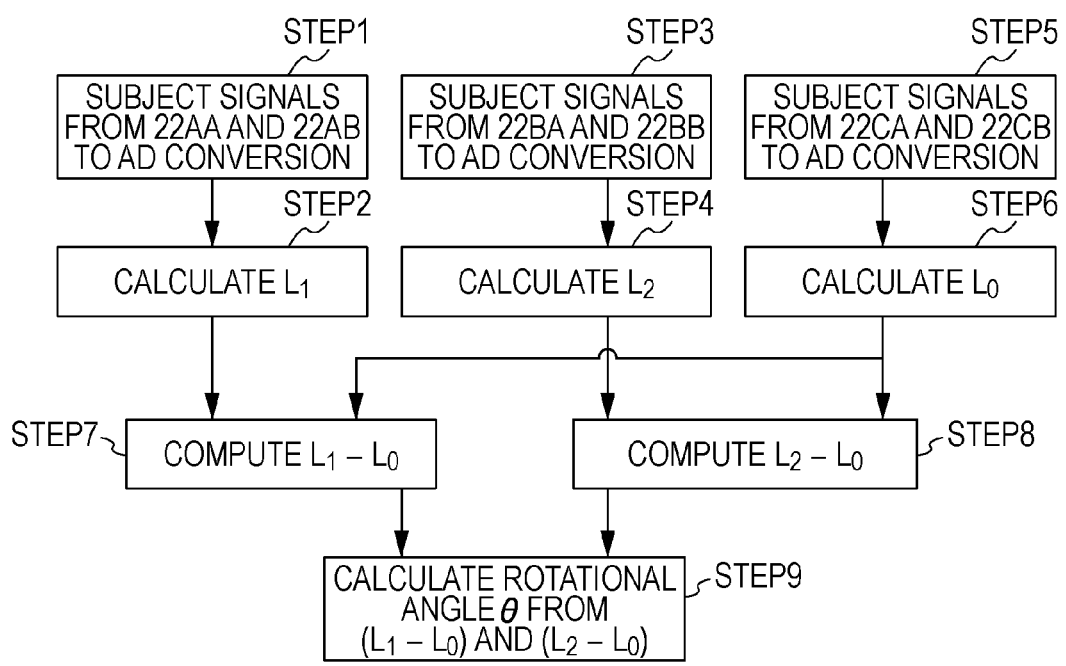
FIG. 28 is a flowchart illustrating steps of signal processing according to the third embodiment.

A flow of signal processing for detecting a rotational angle will be shown in FIG. 28.

1) In step 1, two phases of approximate sine-wave signals having a different phase from the A-phase light reception unit 22AA and the B-phase light reception unit 22AB of the first light reception element 22A generated according to an overlapped state between the first annular slit 25A and the first fixed slit 21A are subjected to AD conversion at the AD conversion element 181 to obtain digital signals.

2) In step 2, based on the two digital signals converted in step 1, distance $L_1$ is computed at the first displacement detection processing unit 201.

3) In step 3, two phases of approximate sine-wave signals having a different phase from the A-phase light reception unit 22BA and the B-phase light reception unit 22BB of the second light reception element 22B generated according to an overlapped state between the second annular slit 25B and the second fixed slit 21B are subjected to AD conversion at the AD conversion element 182 to obtain digital signals.

4) In step 4, based on the two digital signals converted in step 3, distance $L_2$ is computed at the second displacement detection processing unit 202.

5) In step 5, two phases of approximate sine-wave signals having a different phase from the A-phase light reception unit 22CA and the B-phase light reception unit 22CB of the third light reception element 22C generated according to an overlapped state between the third annular slit 25C and the third fixed slit 21C are subjected to AD conversion at the AD conversion element 183 to obtain digital signals.

6) In step 6, based on the two digital signals converted in step 5, distance $L_0$ is computed at the third displacement detection processing unit 203.

7) In step 7, difference $L_1-L_0$ is computed at the subtractor 241 from the distance $L_1$ and distance $L_0$ obtained in step 2 and step 6.

8) In step 8, difference $L_2-L_0$ is computed at the subtractor 242 from the distance $L_2$ and distance $L_0$ obtained in step 4 and step 6.

9) In step 9, based on the difference ($L_1-L_0$ and the difference ($L_2-L_0$) obtained in step 7 and step 8, the rotational angle θ is obtained from Expressions (11) and (12) at the angle detection processing unit 210.

Note that any pair of steps 1 and 2, steps 3 and 4, and steps 5 and 6 may be executed first, or may be processed simultaneously in parallel.

Figure 29:
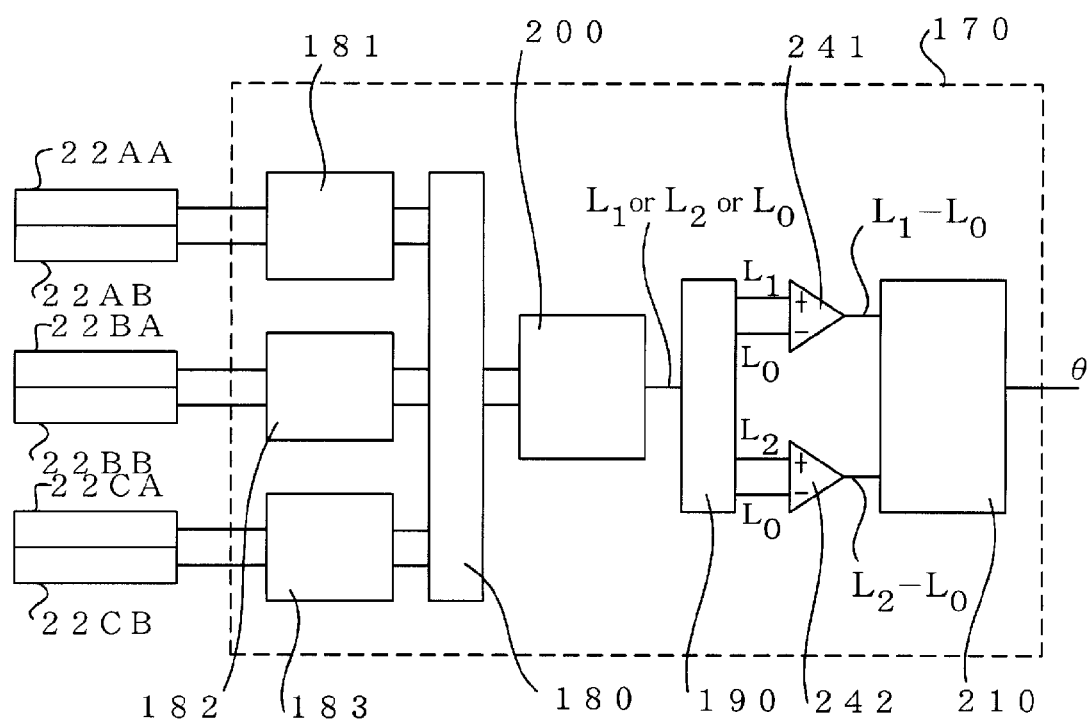
FIG. 29 is a block diagram illustrating a second example of the signal processing device of the optical encoder according to the third embodiment.

Next, another example of the signal processing device according to the present embodiment will be described. FIG. 29 is a block diagram illustrating a second example of the signal processing device of the optical encoder according to the present embodiment, and is an example wherein a single unit is used for the displacement detection processing units of the signal processing device shown in the first example. Note that, with this example, the signal processing device is configured in the same way as the configuration described in FIGS. 11 and 12.

As shown in FIG. 29, the signal processing device 170 includes AD conversion elements 181 through 183, a displacement detection processing unit 200, a switchover switch 180, a storage unit 190, subtractors 241 and 242, and an angle detection processing unit 210.

The switchover switch 180 is provided upstream from the displacement detection processing unit 200. This switchover switch 180 switches a case where the signals from the AD conversion element 181 are input to the displacement detection processing unit 200, a case where the signals from the AD conversion element 182 are input to the displacement detection processing unit 200, and a case where the signals from the AD conversion element 183 are input to the displacement detection processing unit 200. Thus, the signals to be input to the displacement detection processing unit 200 are selected.

The storage unit 190 is provided downstream from the displacement detection processing unit 200. The storage unit 190 stores the calculation result of the distance $L_1$ in the case that the signals digitized at the AD conversion element 181 are input to the displacement detection processing unit, the calculation result of the distance $L_2$ in the case that the signals digitized at the AD conversion element 182 are input to the displacement detection processing unit, and the calculation result of the distance $L_0$ in the case that the signals digitized at the AD conversion element 183 are input to the displacement detection processing unit.

The subtractor 241 obtains $L_1-L_0$ that is difference between the distance $L_1$ stored in the storage unit 190, and the distance $L_0$ stored in the storage unit 190. The subtractor 242 obtains $L_2-L_0$ that is difference between the distance $L_2$ stored in the storage unit 190, and the distance $L_0$ stored in the storage unit 190. Subsequently, the angle detection processing unit 210 detects a rotational angle based on the difference $L_1-L_0$ and the difference $L_2-L_0$.

Figure 30:
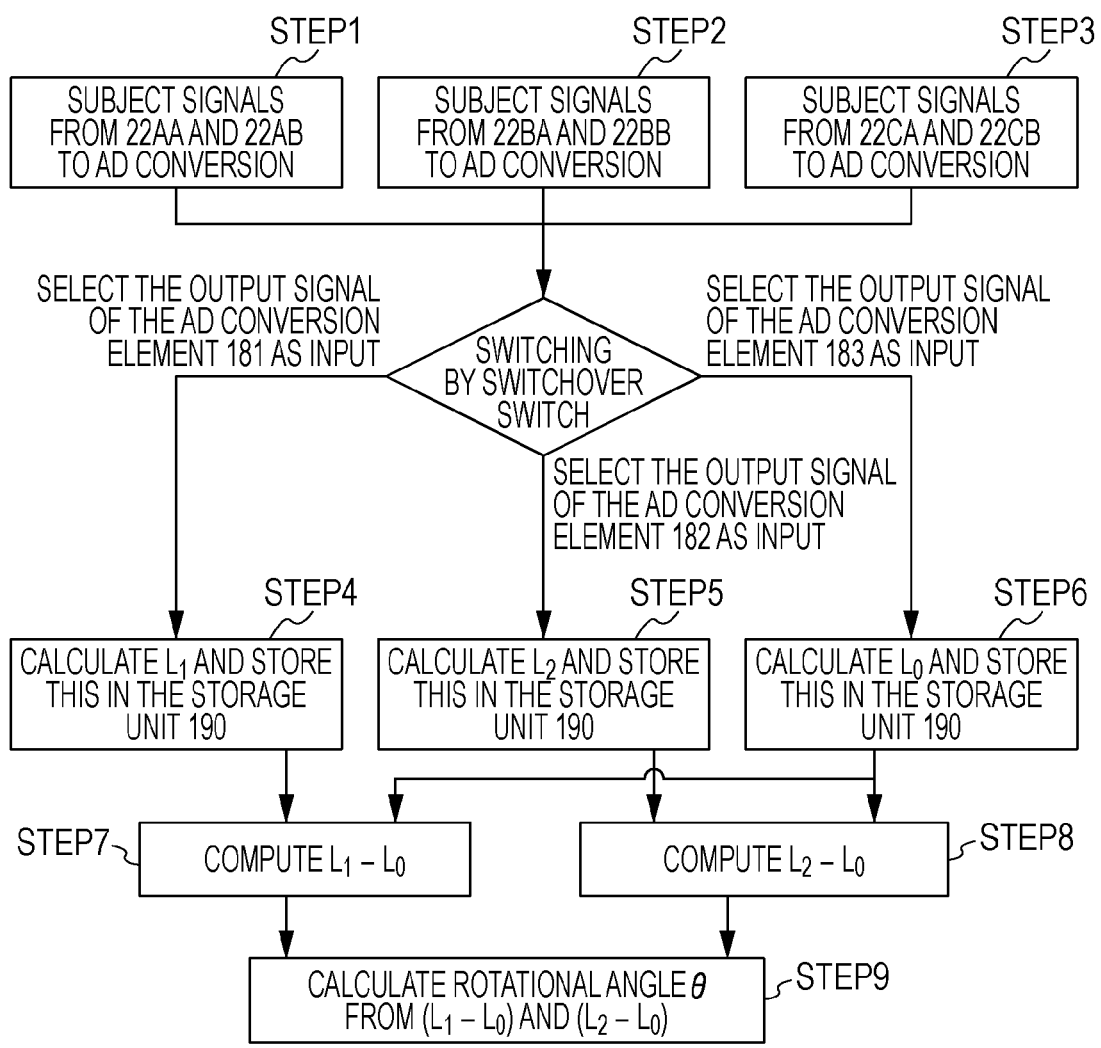
FIG. 30 is a flowchart of another signal processing method of the optical encoder according to the third embodiment.

A flow of signal processing for detecting a rotational angle will be shown in FIG. 30.

1) In step 1, two phases of approximate sine-wave signals having a different phase from the A-phase light reception unit 22AA and the B-phase light reception unit 22AB of the first light reception element 22A generated according to an overlapped state between the first annular slit 25A and the first fixed slit 21A are subjected to AD conversion at the AD conversion element 181 to obtain digital signals.

2) In step 2, two phases of approximate sine-wave signals having a different phase from the A-phase light reception unit 22BA and the B-phase light reception unit 22BB of the second light reception element 22B generated according to an overlapped state between the second annular slit 25B and the second fixed slit 21B are subjected to AD conversion at the AD conversion element 182 to obtain digital signals.

3) In step 3, two phases of approximate sine-wave signals having a different phase from the A-phase light reception unit 22CA and the B-phase light reception unit 22CB of the third light reception element 22C generated according to an overlapped state between the third annular slit 25C and the third fixed slit 21C are subjected to AD conversion at the AD conversion element 183 to obtain digital signals.

4) In step 4, in response to the switchover signal from an upper control unit (not shown), upon the switchover switch 180 selecting the two digital signals converted in step 1 as the input of the displacement detection processing unit 200, the displacement detection processing unit 200 computes the distance $L_f$, and stores this in the storage unit 190.

5) In step 5, in response to the switchover signal from the upper control unit, upon the switchover switch 180 selecting the two digital signals converted in step 2 as the input of the displacement detection processing unit 200, the displacement detection processing unit 200 computes the distance $L_{0f}$ and stores this in the storage unit 190.

6) In step 6, in response to the switchover signal from the upper control unit, upon the switchover switch 180 selecting the two digital signals converted in step 3 as the input of the displacement detection processing unit 200, the displacement detection processing unit 200 computes the distance $L_0$, and stores this in the storage unit 190.

7) In step 7, difference $L_1-L_0$ is computed at the subtractor 241 from the distance $L_1$ and distance $L_0$ obtained in step 4 and step 6.

8) In step 8, difference $L_2-L_0$ is computed at the subtractor 242 from the distance $L_2$ and distance $L_0$ obtained in step 5 and step 6.

9) In step 9, in response to the switchover signal from the upper, based on the difference $(L_1-L_0)$ and the difference $(L_2-L_0)$ obtained in step 7 and step 8, the angle detection processing unit 210 obtains the rotational angle θ from Expressions (11) and (12).

Note that any of steps 1 through 3 may be executed first, or, may be processed simultaneously in parallel.

Figure 31:
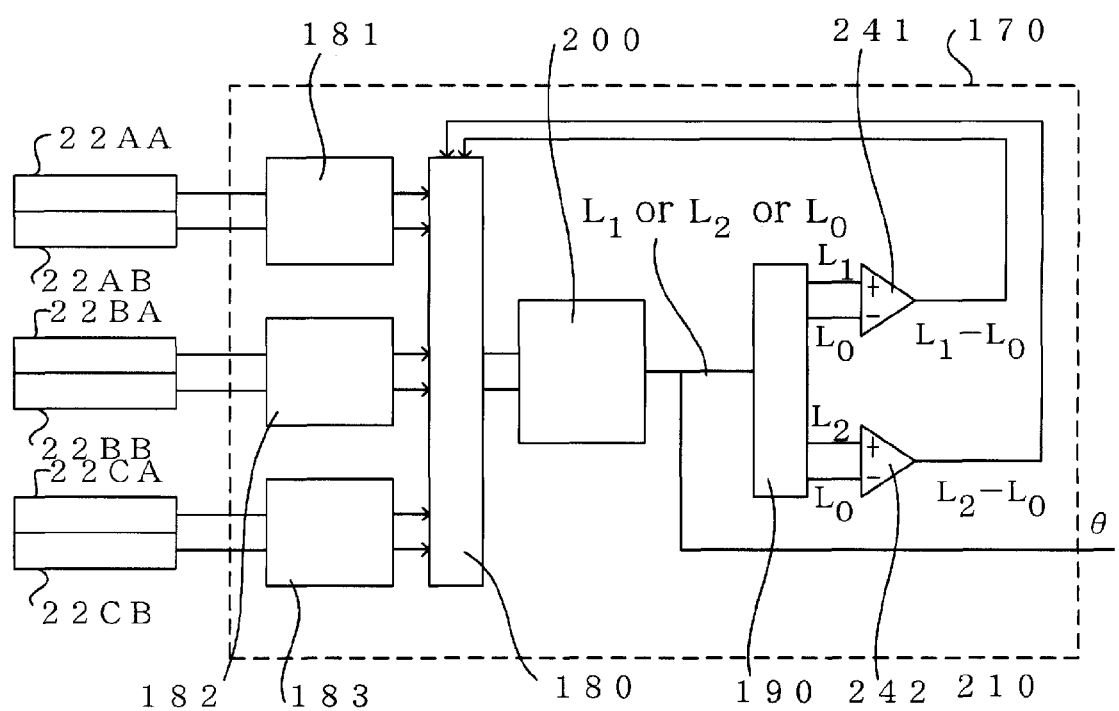
FIG. 31 is a block diagram illustrating a third example of the signal processing device of the optical encoder according to the third embodiment.

Next, yet another example of the signal processing device according to the present embodiment will be described. FIG. 31 is a block diagram illustrating a third example of the signal processing device of the optical encoder according to the present embodiment, and is an example wherein a single unit is used for the displacement detection processing unit and the angle detection processing unit of the signal processing device shown in the first example. Note that, with this example, the signal processing device is configured in the same way as the configuration described in FIGS. 13 and 14.

As shown in FIG. 31, the signal processing device 170 includes AD conversion elements 181 through 183, a switchover switch 180, a displacement detection processing unit 200, a storage unit 190, and subtractors 241 and 242.

The switchover switch 180 is provided upstream from the displacement detection processing unit 200. This switchover switch 180 switches four cases of a case where the signals from the AD conversion element 181 are input to the displacement detection processing unit 200, a case where the signals from the AD conversion element 182 are input to the displacement detection processing unit 200, a case where the signals from the AD conversion element 183 are input to the displacement detection processing unit 200, and a case where $L_1-L_0$ and $L_2-L_0$ that are differences of the calculation results in the above three cases are input to the displacement detection processing unit 200. Thus, the signals to be input to the displacement detection processing unit 200 are selected.

The storage unit 190 is provided downstream from the displacement detection processing unit 200. The storage unit 190 stores the calculation result of the distance $L_1$ in the case that the signals digitized at the AD conversion element 181 are input to the displacement detection processing unit 200, the calculation result of the distance $L_2$ in the case that the signals digitized at the AD conversion element 182 are input to the displacement detection processing unit 200, and the calculation result of the distance $L_0$ in the case that the signals digitized at the AD conversion element 183 are input to the displacement detection processing unit 200.

Figure 32:
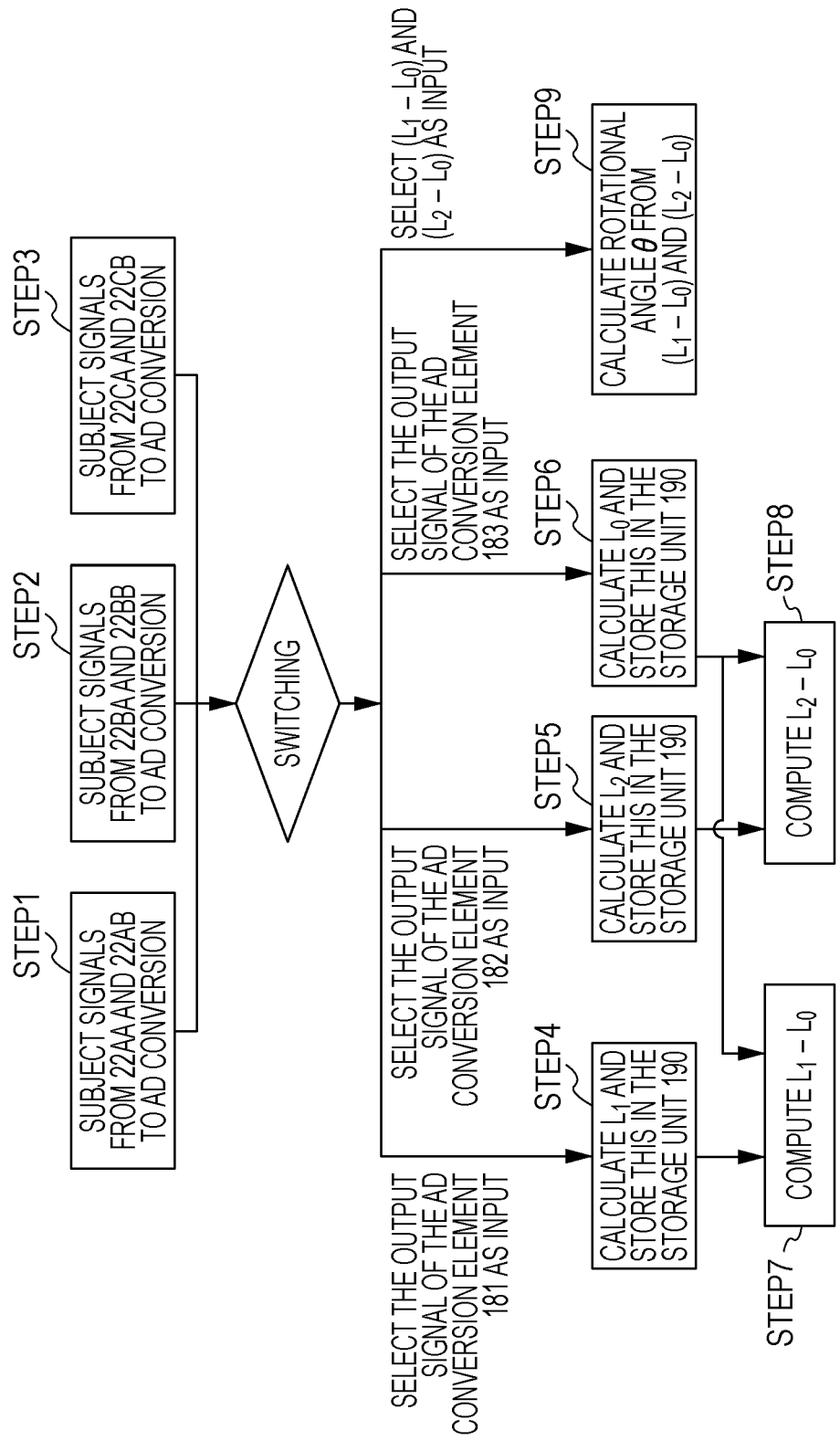
FIG. 32 is a flowchart of another signal processing method of the optical encoder according to the third embodiment.

Next, steps of signal processing for detecting a rotational angle will be described. FIG. 32 is a flowchart illustrating steps of signal processing according to the present embodiment.

1) In step 1, two phases of approximate sine-wave signals having a different phase from the A-phase light reception unit 22AA and the B-phase light reception unit 22AB of the first light reception element 22A generated according to an overlapped state between the first annular slit 25A and the first fixed slit 21A are subjected to AD conversion at the AD conversion element 181 to obtain digital signals.

2) In step 2, two phases of approximate sine-wave signals having a different phase from the A-phase light reception unit 22BA and the B-phase light reception unit 22BB of the second light reception element 22B generated according to an overlapped state between the second annular slit 25B and the second fixed slit 21B are subjected to AD conversion at the AD conversion element 182 to obtain digital signals.

3) In step 3, two phases of approximate sine-wave signals having a different phase from the A-phase light reception unit 22CA and the B-phase light reception unit 22CB of the third light reception element 22C generated according to an overlapped state between the third annular slit 25C and the third fixed slit 21C are subjected to AD conversion at the AD conversion element 183 to obtain digital signals.

4) In step 4, in response to the switchover signal from an upper control unit (not shown), upon the switchover switch 180 selecting the two digital signals converted in step 1 as the input of the displacement detection processing unit 200, the displacement detection processing unit 200 computes the distance $L_1$, and stores this in the storage unit 190.

5) In step 5, in response to the switchover signal from the upper control unit, upon the switchover switch 180 selecting the two digital signals converted in step 2 as the input of the displacement detection processing unit 200, the displacement detection processing unit 200 computes the distance $L_0$, and stores this in the storage unit 190.

6) In step 6, in response to the switchover signal from the upper control unit, upon the switchover switch 180 selecting the two digital signals converted in step 3 as the input of the displacement detection processing unit 200, the displacement detection processing unit 200 computes the distance $L_0$, and stores this in the storage unit 190.

7) In step 7, difference $L_1-L_0$ is computed at the subtractor 241 from the distance $L_1$ and distance $L_0$ obtained in step 4 and step 6.

8) In step 8, difference $L_2-L_0$ is computed at the subtractor 242 from the distance $L_2$ and distance $L_0$ obtained in step 5 and step 6.

9) In step 9, in response to the switchover signal from the upper control unit, upon the switchover switch 180 selecting the difference $L_1-L_0$ and the difference $L_2-L_0$ computed in steps 7 and 8 as the input to the displacement detection processing unit 200, based on the difference $L_1-L_0$ and the difference $L_2-L_0$, the displacement detection processing unit 200 obtains the rotational angle $\theta$ from Expressions (11) and (12).

Note that any of steps 1 through 3 may be executed first, or, may be processed simultaneously in parallel.

As described above, according to the present embodiment of the present invention, even in the case that the rotation disc is attached with the center of the rotation disc deviating from the rotation center of the rotation axis, a rotational angle can be detected accurately over the entire circumference of 0 through 360 degrees.

Fourth Embodiment

Figure 33:
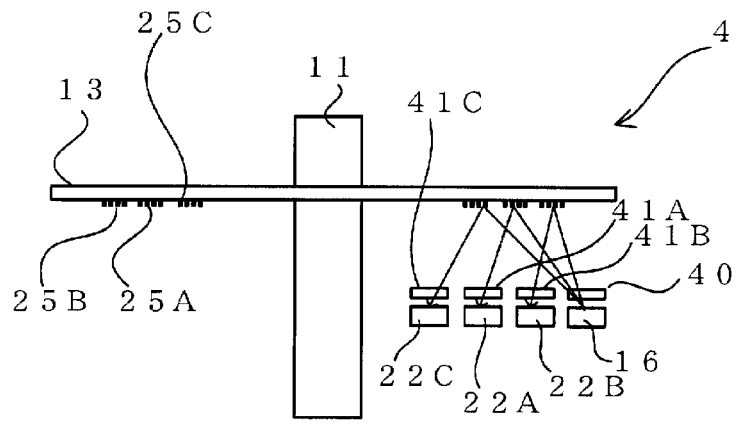
FIG. 33 is a side view of an optical encoder illustrating a fourth embodiment of the present invention.

FIG. 33 is a side view of an optical encoder illustrating a fourth embodiment of the present invention. The optical encoder 4 according to the present embodiment newly includes, such as shown in FIG. 33, a light source slit 40. The light slit unit 40 is a light source slit disposed before the light source 16. The light source slit 40, third annular slit 25C, and third index slit 41C make up three grids.

That is to say, a point where the present embodiment differs from the third embodiment is in that the light slit 40 is provided, and the reflection-type optical encoder 4 according to a three-grid optical system is configured. Also, as compared to the second embodiment, the third embodiment has the configuration of the second embodiment to which the third annular slit, and the optical system corresponding thereto, i.e., the third index slit 41C and the third light reception element 22C are added. Note that the signal processing unit 17 according to the present embodiment may be configured in the same way as the above third and second embodiments, description will be omitted as appropriate.

Figure 34:
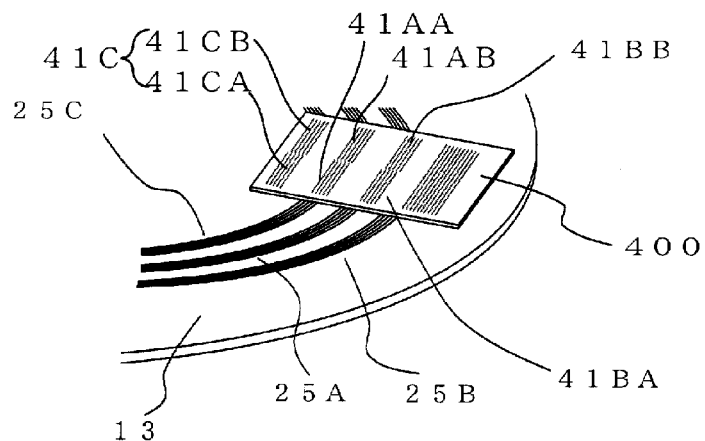
FIG. 34 is a perspective view illustrating the layout of a rotation disc, a light source slit, and an index slit, according to the fourth embodiment.
Figure 35:
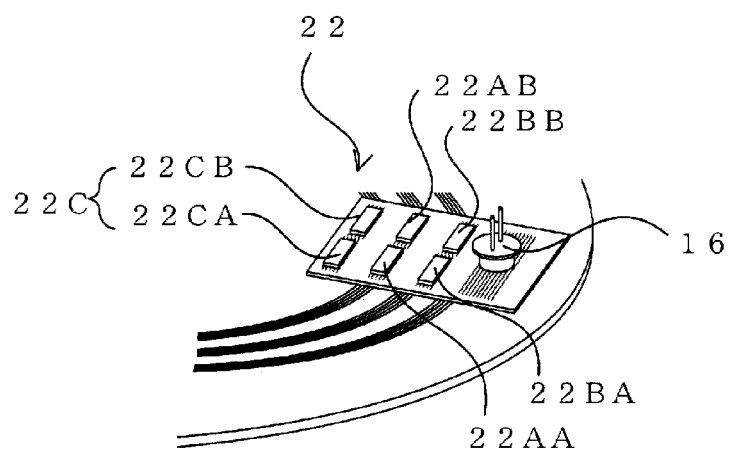
FIG. 35 is perspective view displaying FIG. 34 by adding a light source and a light reception element thereto.

A specific configuration will be described with reference to the perspective views in FIGS. 34 and 35. FIG. 34, which is a perspective view illustrating the configuration of the optical encoder according to the present embodiment, illustrates the layout of the rotation disc 13, light source slit 40, and index slit 41. Also, FIG. 35 shows the arrangement in FIG. 34, while adding a light source 16 and a light reception element 22 thereto.

Thus, with the present embodiment, a third annular slit, and an optical system corresponding thereto, and a reflection-type optical system according to a three-grid optical system are used. Thus, according to the present embodiment, a rotational angle can be detected accurately over the entire circumference of 0 through 360 degrees, and also an optical encoder 4 can be realized where a stable sensor signal can be obtained even if a gap fluctuates. Further, in the event that all of the optical components such as the light source, fixed slit, light reception element, and the like are disposed in one place in an intensive manner, the device can be reduced in size.

Fifth Embodiment

Figure 36:
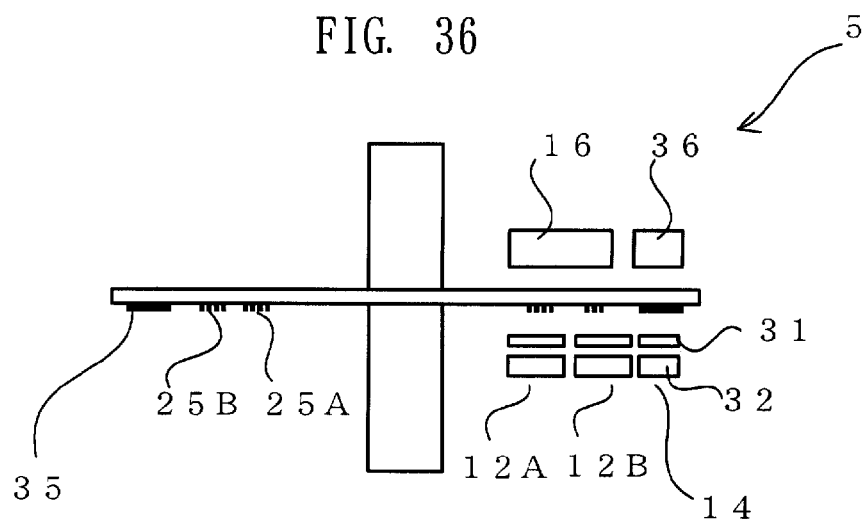
FIG. 36 is a side view of an optical encoder illustrating a fifth embodiment of the present invention.
Figure 37:
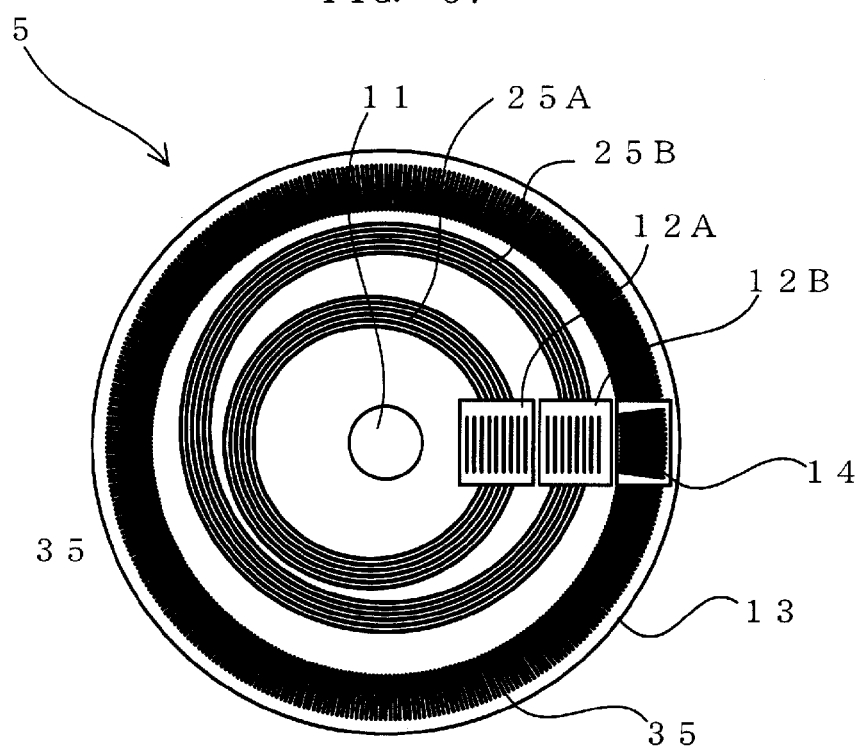
FIG. 37 is a plan view of the optical encoder according to the fifth embodiment.

FIG. 36 is a side view of an optical encoder illustrating a fifth embodiment of the present invention, and FIG. 37 is a plan view. Note that the plan view in FIG. 37 is a view viewed from the paper bottom of FIG. 36. The same components as those of the encoder according to the first embodiment or the like will be denoted with the same reference numerals, and description thereof will be omitted.

The optical encoder 5 according to the present embodiment includes, such as shown in FIG. 36, an incremental slit 35, an incremental detecting unit 14, an incremental light source 36, an incremental light reception element 32, and an incremental fixed slit 31. The incremental detecting unit 14 includes an incremental fixed slit 31, and an incremental light reception element 32.

A point where the present embodiment differs from the first embodiment is in that an incremental slit 35 is formed on the rotation disc, and an incremental light source 36, an incremental light reception element 32, and an incremental fixed slit 31 making up an optical system corresponding thereto are added.

The incremental slit 35 is formed in a radial shape as to the rotation center. Corresponding to this, the incremental fixed slit 31 of the incremental detecting unit 14 has multiple parallel slit patterns or multiple radial slit patterns with the rotation center as the center so as to be generally in parallel with the incremental slit 35. The incremental light source 36 irradiates light on the incremental slit 35 in the same way as with the light source 16, and the light transmitted through the incremental slit 35 is irradiated on the incremental fixed slit 31. Subsequently, the incremental light reception element 32 receives the light transmitted through the incremental fixed slit 31, and outputs the incremental signal to a signal processing device 17 (not shown here). Consequently, the signal processing device 17 calculates the rotational angle $\theta$ further using the incremental signal. Note that the calculation of the rotational angle $\theta$ from the incremental signal by the signal processing device 17 may be realized by changing the signal processing described in the first through fourth embodiments into processing according to a normal incremental signal as appropriate, and accordingly, detailed description will be omitted here.

Though not shown in the drawing, in order to detect the absolute value of a rotational angle, and the rotational direction, the incremental fixed slit 31 is made up of two phases of slit groups having a mutual different phase, and the incremental light reception element 32 is provided to each of the slot groups. Note that the incremental light source 36 has been provided separately from the light source 16, but one light source may serve as both for reduction in size.

Next, the operation of the present embodiment will be described. Upon the rotation axis 11 being rotated, each incremental light reception element 32 outputs the sine-wave-shaped signal corresponding to a rotational angle. The inner one pitch of this sine-wave-shaped incremental signal is subjected to interpolation division processing by an arithmetic device not shown in the drawing, and interpolation signals from angle pitches are combined using an absolute angle signal to be obtained from the annular slit 25A and the annular slit 25B shown in the first embodiment so as to interpolate the absolute angle signal obtained from the annular slit 25A and the annular slit 25B using a high-resolution incremental signal. Thus, a high-resolution absolute angle signal is obtained.

The absolute angle signal to be obtained from the annular slit 25A and the annular slit 25B should have resolution sufficient for determining one cycle of the incremental signal, and the resolution of the whole encoder depends on the resolution by the interpolation division of the incremental signal, and accordingly, very high resolution can be obtained.

Sixth Embodiment

Figure 38:
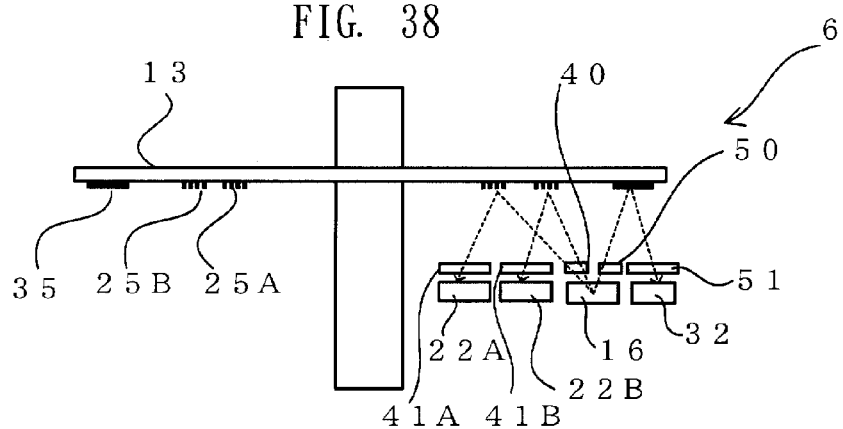
FIG. 38 is a side view of an optical encoder illustrating a sixth embodiment of the present invention.

FIG. 38 is a side view of an optical encoder illustrating a sixth embodiment of the present invention. The principal difference as to the fifth embodiment is in that the sixth embodiment has the configuration of a reflection type optical system to which three-grid principle has been applied in the same way as with the second and fourth embodiments as to the first and third embodiments.

That is to say, with the optical encoder 6 according to the present embodiment, before the light source 16 a light source slit 40 (for absolute value) and an incremental light source slit 50 are provided. The light source slit 40, first annular slit 25A, and first index slit 41A make up three grids, and also the light source slit 40, second annular slit 25B, and second index slit 41B make up three grids. Further, the incremental light source slit 50, incremental slit 35, and incremental index slit 51 make up three grids.

Figure 39:
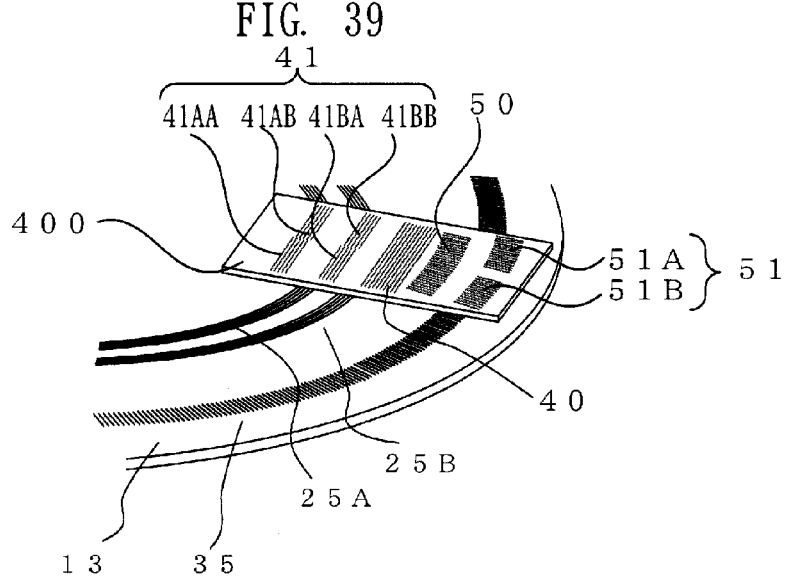
FIG. 39 is a perspective view illustrating the configuration of the optical encoder according to the sixth embodiment, and illustrates the layout of a rotation disc, a light source slit, an incremental light source slit, an index slit 41, and an incremental index slit.
Figure 40:
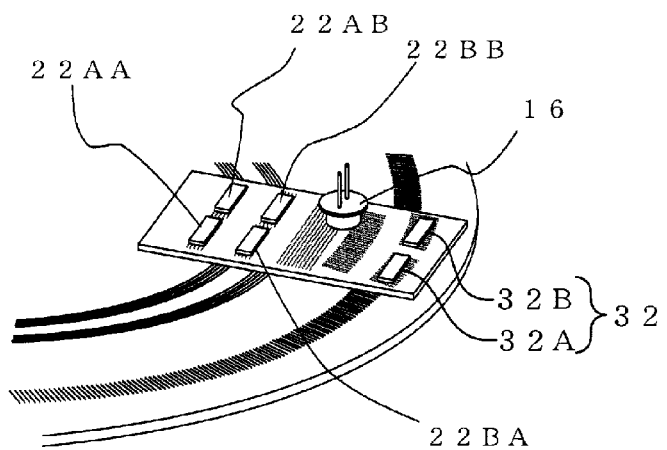
FIG. 40 is a perspective view displaying FIG. 39 by adding a light source, a light reception element (for an absolute value), and an incremental light reception element thereto.

A specific configuration will be described with reference to the perspective views in FIGS. 39 and 40. FIG. 39 illustrates the layout of the rotation disc 13, light source slit 40, incremental light source slit 50, index slit 41, and incremental index slit 51. FIG. 40 shows the arrangement in FIG. 39, while adding the light source 16, light reception element 22 (for absolute value), and incremental light reception element 32 thereto. The light source slit 40 and the incremental light source slit 50 are formed in a place which the light from the light source 16 passes through.

In order to detect the direction of the first annular slit displacement, the first index slit 41A is configured of an A-phase slit 41AA, and a B-phase slit 41AB of which the phases are shifted such as shown in FIG. 39. Corresponding thereto, the first light reception element 22A is also divided into an A-phase light reception unit 22AA and a B-phase light reception unit 22AB such as shown in FIG. 40. Similarly, the second index slit 41B is also formed of an A-phase slit 41BA and a B-phase slit 41BB of which the phases are shifted, and the second light reception element 22B is also divided into an A-phase light reception unit 22BA and a B-phase light reception unit 22BB.

Further, the incremental index slit 51 is also formed of an A-phase slit 51A and a B-phase slit 51B of which the phases are shifted, and the incremental light reception element 32 is also divided into an A-phase light reception unit 32A and a B-phase light reception unit 32B.

Also, with the present embodiment, the shapes of the light source slit 40 and the index slit 41 (41AA, 41AB, 41BA, 41BB) preferably have a linear shape perpendicular to the radial direction of the rotation disc, and the incremental light source slit 50 and the incremental index slit 51 (51A, 51B) preferably have a radial shape.

Further, a substantial slit pitch with the pitch in a detection position (e.g., the slit center) of the radial slit of the incremental slit 35 as a slit pitch is set to the same as the slit pitch of the annular slit 25, whereby the gaps of the index slit 41 and the incremental index slit 51 as to the rotation disc 13 can be set to the same. Note that it is known that, with a three-grid optical system, the conditions of a gap where the linear light source of the light source slit forms an image on the index slit 41 and the incremental index slit 51 depend on the pitch of grids.

Note that the light source slit 40, the A-phase slit 41AA and the B-phase slit 41AB of the first index slit, the A-phase slit 41BA and the B-phase slit 41BB, the incremental light source slit 50, and the A-phase slit 51A and the B-phase slit 51B of the incremental index slit may be formed on the same substrate shown in 400 in FIG. 39. Also, the index slit 41 and the incremental index slit 51 may be formed integrally with a light reception element so as to form a mask on the light reception element surface without being formed on the substrate 400.

Thus, with the present embodiment, the optical system using the three-grid principle has been applied to the configuration in the fifth embodiment, whereby an optical encoder which can handle gap fluctuation between the rotation disc and the fixed slit well can be realized in addition to the effects of the fifth embodiment.

Also, with the present embodiment, diffusion light is used as a light source. One light source is readily irradiated on the light source slit 40 and the incremental light source slit 50 simultaneously by using diffusion light, and accordingly, a single light source is used for these light sources. Thus, the device according to the present embodiment to which the three-grid principle has been applied is more adapted to reduction in size.

Seventh Embodiment

Figure 41:
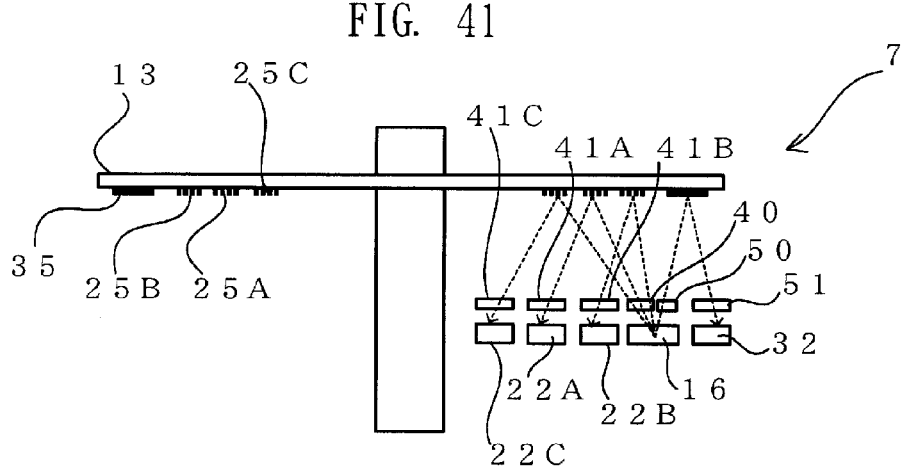
FIG. 41 is a side view of an optical encoder illustrating a seventh embodiment of the present invention.

FIG. 41 is a side view of an optical encoder illustrating a seventh embodiment of the present invention. The optical encoder 7 according to the present embodiment includes, such as shown in FIG. 41, a third annular slit 25C, a third index slit 41C corresponding to the third annular slit 25C, and a third light reception element 22C.

A point where the present embodiment differs from the sixth embodiment is in that, in the same way as with the third embodiment as to the second embodiment, a third annular slit 25C is formed on the rotation disc, and an index slit 41C, and a third light reception element 22C making up an optical system corresponding thereto are added, and a point where the three-grid optical system has been applied is the same as with the second, third, and sixth embodiments.

A specific configuration will be described with reference to the perspective views in FIGS. 42 and 43.

Figure 42:
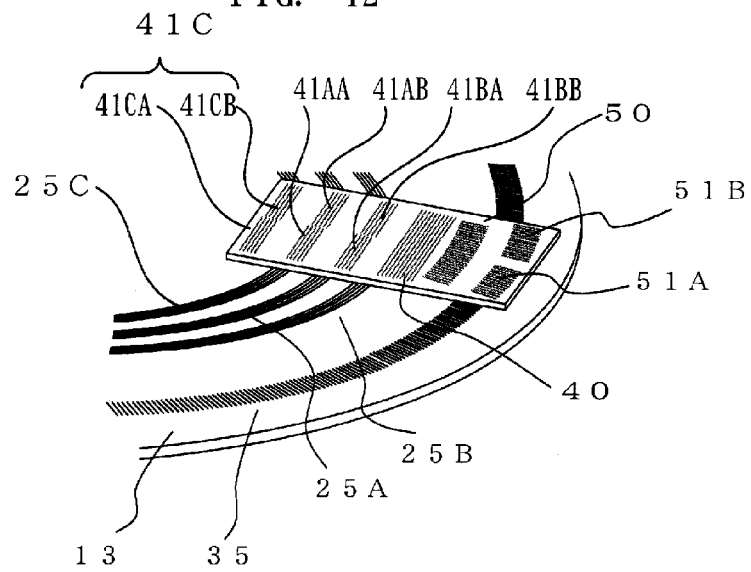
FIG. 42 is a perspective view illustrating the configuration of the optical encoder according to the seventh embodiment, and illustrates the layout of a rotation disc, a light source slit, and an index slit.
Figure 43:
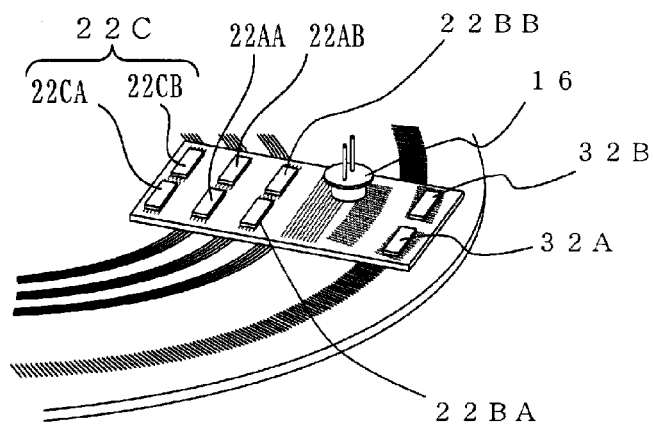
FIG. 43 is a perspective view displaying FIG. 42 by adding a light source, and a third light reception element thereto.

FIG. 42, which is a perspective view illustrating the configuration of the optical encoder according to the present embodiment, illustrates the layout of the rotation disc, and an index slit. As compared to the sixth embodiment in FIG. 39, the seventh embodiment has the configuration of the seventh embodiment to which a third annular slit 25C and a third fixed slit 41C are added. Also, FIG. 43 shows the arrangement in FIG. 42, while adding a light source 16 and a light reception element 22C thereto.

Thus, with the present embodiment, the third annular slit, and the third fixed slit and the third light reception element which make up the optical system corresponding thereto are added to the configuration of the sixth embodiment, and accordingly, in addition to the effects of the sixth embodiment, even in the case that the rotation disc is attached with the center of the rotation disc deviating from the rotation center of the rotation axis, an optical encoder capable of detecting a rotational angle accurately over the entire circumference of 0 through 360 degrees can be realized.

<Motor and Motor System According to Each Embodiment of Present Invention>

The optical encoder according to each of the embodiments of the present invention has been described so far. On the other hand, a motor system 1000 or motor 1010 according to each of the embodiments of the present invention includes one of the optical encoders 1 through 7 described in the first through seventh embodiments.

Figure 44:
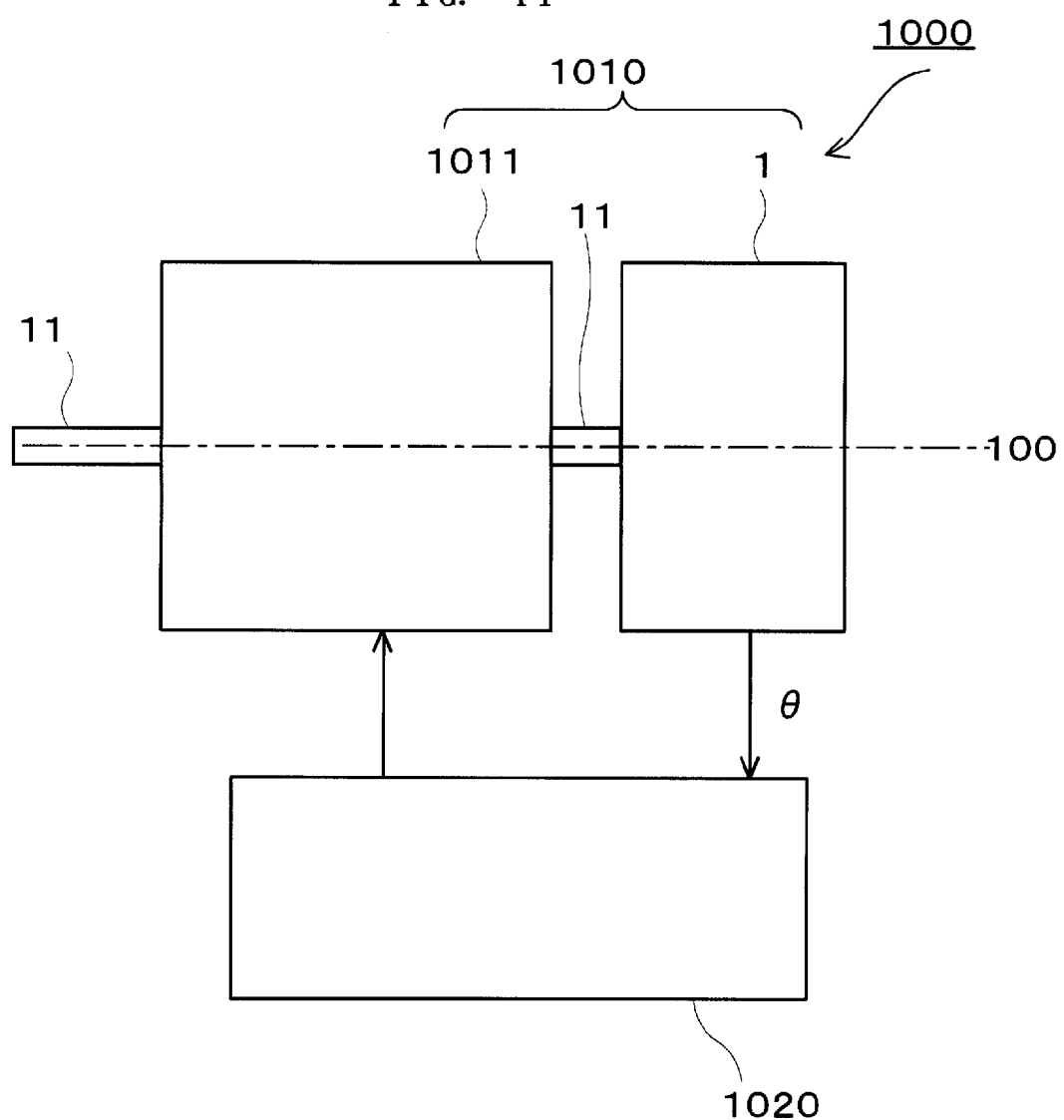
FIG. 44 is a block diagram illustrating the configuration of a motor and a motor system, according to each embodiment of the present invention.

FIG. 44 is a block diagram illustrating the configuration of a motor system and a motor according to each of the embodiments of the present invention. Note that this FIG. 44 exemplifies a case where the optical encoder 1 according to the first embodiment is used as an optical encoder example. However, the optical encoder included in the motor system 1000 and the motor 1010 may be one of the optical encoders 1 through 7 according to the first through seventh embodiments.

As shown in FIG. 44, the motor system 1000 according to each of the embodiments of the present invention includes a motor 1010, and a control unit 1020. The motor 1010 includes a motor unit 1011, and an optical encoder 1.

The motor 1011 rotates a rotation axis 11 by the control signal from the control unit 1020, thereby outputting turning force. Note that this rotation axis 11 is formed integrally with or separately connected to the rotation axis 11 of the optical encoder 1, and accordingly, the rotation disc 13 is rotated following the rotation of the motor unit 1011. On the other hand, the optical encoder 1 detects, as described above, the rotational angle θ due to the rotation of the rotation disc 13, and this rotational angle θ is transmitted to the control unit 1020. The control unit 1020 outputs a control signal to the motor unit 1011 so that the rotational angle θ becomes a desired value (e.g., the value specified by an upper control device (not shown)), thereby controlling the motor unit 1011. Accordingly, according to the motor system 1000 or motor 1010 according to each of the embodiments of the present invention, operation effects and the like that the above optical encoders 1 through 7 perform can be performed.

Note that, as described above, with the motor system 1000 or motor 1010, one of the optical encoders 1 through 7 described in the first through seventh embodiments can be used. The outlines of the optical encoders 1 through 7 according to these embodiments will be described further as follows.

An optical encoder according to an embodiment of the present invention includes a rotation disc, which is attached to a rotation axis, having an annular slit made up of multiple equal-pitched concentric slit patterns formed decentered as to the rotation center of the rotation axis; an absolute-value-related detecting unit, which is provided to a fixed member, configured to detect transmitted light or reflected light from a light source for irradiating the annular slit, and the annular slit; with the annular slit including a first annular slit and a second annular slit which are decentered in a mutually different direction; with the absolute-value-related detecting unit including a first detecting unit corresponding to the first annular slit, and a second detecting unit corresponding to the second detecting unit; and with the optical encoder detecting the absolute rotational angle of the rotation axis from the detected signal output from the absolute detecting unit.

According to this embodiment, the optical encoder includes a first annular slit and a second annular slit decentered in a mutually different direction on a rotation disc, and a first detecting unit corresponding to the first annular slit and a second detecting unit corresponding to the second annular slit are provided to a fixed member, whereby the absolute value of the angle of a rotation axis can be detected over the entire circumference of 0 through 360 degrees. Also, the optical components such as the light source, first detecting unit, second detecting unit, and the like can be disposed in a one place in an intensive manner, whereby the device can be reduced in size.

Also, the slit pitches of the first annular slit and the second annular slit may be equal to or greater than the corresponding decentered amount as to the center of the rotation disc.

According to such a configuration, with a further arrangement wherein the slit pitches of the first annular slit and the second annular slit are set to equal to or greater than the corresponding decentered amount as to the center of the rotation disc, the displacement amount of the annular slit is within one pitch of the annular slit, and accordingly, the displacement amount is uniquely determined with the detected signals output from the first detecting unit and the second detecting unit, and the signal processing device is simplified.

The first detecting unit may be configured of a first fixed slit where the same pitch slit as the first annular slit is formed, and a first light reception element for detecting transmitted light from the first fixed slit, and the second detecting unit may be configured of a second fixed slit where the same pitch slit as the second annular slit is formed, and a second light reception element for detecting transmitted light from the second fixed slit.

The first detecting unit may be configured of a slit-patterned light reception element where the same pitch slit as the first annular slit is formed, and the second detecting unit may be configured of a slit-patterned light reception element where the same pitch slit as the second annular slit is formed.

The rotation disc may include an incremental slit formed in a radial shape as to the center of the rotation disc, and the fixed member may include an incremental light source for irradiating the incremental slit, and an incremental detecting unit for detecting transmitted light or reflected light from the incremental slit.

According to such a configuration, a further arrangement wherein the rotation disc includes an incremental slit and the fixed member includes an incremental detecting unit can obtain a high-resolution absolute angle signal.

The annular slit and the incremental slit may be irradiated with a common light source.

An arrangement may be made wherein the light source includes a light source slit for restricting the irradiated light from the light source, the light restricted at the light source slit and reflected at the first annular slit is detected at the first detecting unit, the light restricted at the light source slit and reflected at the second annular slit is detected at the second detecting unit.

According to such a configuration, a further arrangement wherein the light source includes a light source slit for restricting the irradiated light from the light source, can realize an optical encoder which can handle gap fluctuation between the rotation disc and the fixed slit well.

The rotation disc may include an incremental slit formed in a radial shape as to the center of the rotation disc, the light source may include an incremental light source slit for restricting the irradiated light from the light source, and the fixed member may include an incremental detecting unit for detecting the reflected light from the incremental slit irradiated at the light source.

The absolute rotational angle calculated based on the detected signal output from the absolute-value-related detecting unit may be interpolated with an interpolation signal in which the repeat signal obtained from the incremental detecting unit is interpolated.

The substantial slit pitches of the first annular slit, the second annular slit, and the incremental slit may be the same.

An optical encoder according to an embodiment of the present invention includes a rotation disc, which is attached to a rotation axis, having an annular slit made up of multiple equal-pitched concentric slit patterns formed decentered as to the rotation center of the rotation axis; an absolute-value-related detecting unit, which is provided to a fixed member, configured to detect transmitted light or reflected light from a light source for irradiating the annular slit, and the annular slit; with the annular slit including a first annular slit and a second annular slit which are decentered in a mutually different direction, and a third annular slit formed of which at least either the decentered direction or decentered amount differs from those of the first annular slit and the second annular slit; with the absolute-value-related detecting unit including first through third detecting units corresponding to the first through third annular slits, respectively; and with the optical encoder detecting the absolute rotational angle of the rotation axis from the detected signal output from the absolute detecting unit.

According to this embodiment, the optical encoder includes, on the rotation disc, a first annular slit and a second annular slit which are decentered in a mutually different direction, and a third annular slit formed of which at least either the decentered direction or decentered amount differs from those of the first annular slit and the second annular slit, and includes, on the fixed member, a first through third detecting units corresponding to the first through third annular slits, respectively, and accordingly, even in the case that the rotation disc is attached with the center of the rotation disc deviating from the rotation center of the rotation disc, a rotational angle can be detected accurately over the entire circumference of 0 through 360 degrees.

The third annular slit may be configured of multiple concentric slits formed without decentering as to the center of the rotation disc.

According to such a configuration, with a further arrangement wherein third annular slit is formed without decentering, a rotational angle can be detected accurately over the entire circumference of 0 through 360 degrees, even in the case that the rotation disc is attached with the center of the rotation disc deviating from the rotation center of the rotational angle.

All the slit pitches of the first through third embodiments may be equal to or greater than the corresponding decentered amount as to the center of the rotation disc.

The first through third detecting units may be configured of first through third fixed slits where the same pitched slit as with the first through third annular slits is formed, and first through third light reception elements for detecting the transmitted light from the first through third fixed slits respectively.

The first through third detecting units may be configured of light reception elements having slit patterns where the same pitched slits as the first through third annular slits are formed, respectively.

The rotation disc may include an incremental slit formed in a radial shape as to the center of the rotation disc, and the fixed member may include an incremental light source for irradiating the incremental slit, and an incremental detecting unit for detecting transmitted light or reflected light from the incremental slit.

The annular slit and the incremental slit may be irradiated with a common light source.

An arrangement may be made wherein the light source includes a light source slit for restricting the irradiated light from the light source, the light restricted at the light source slit and reflected at the first through third annular slits are detected at the first through third detecting units respectively.

The rotation disc may include an incremental slit formed in a radial shape as to the center of the rotation disc, the light source may include an incremental light source slit for restricting the irradiated light from the light source, and the optical encoder may include on the fixed member an incremental detecting unit for detecting the reflected light from the incremental slit irradiated at the light source.

The absolute rotational angle calculated based on the detected signal output from the absolute-value-related detecting unit may be interpolated with an interpolation signal in which the repeat signal obtained from the incremental detecting unit is interpolated.

The substantial slit pitches of the first through third annular slits, and the incremental slit may be the same.

The optical encoder may further include a first displacement detection processing unit for calculating first displacement that is displacement in the radial direction of the rotation axis of the first annular slit based on the signal from the first detecting unit; a second displacement detection processing unit for calculating second displacement that is displacement in the radial direction of the rotation axis of the second annular slit based on the signal from the second detecting unit; and an angle detection processing unit for calculating the rotational angle of the rotation disc based on the first displacement and the second displacement.

According to such a configuration, a further arrangement may be made wherein, with the signal processing method of the optical encoder including a first annular slit and a second annular slit which are decentered in a mutually different direction, the displacement in the radial direction of each of the first and second annular slits is calculated, and a rotational angle is detected from this displacement, and accordingly, the rotational angles of the rotation axis from both displacement are uniquely determined, and the absolute value of the angle of the rotation axis can be detected over the entire circumference of 0 through 360 degrees.

The optical encoder may further include a signal processing device including a switchover processing unit for switching the signal from the first detecting unit and the signal from the second detecting unit, a displacement detection processing unit for detecting the first displacement in the case that the signal from the first detecting unit is input by the switchover processing unit, and the second displacement in the case that the signal from the second detecting unit is input by the switchover processing unit, and an angle detection processing unit for calculating the rotational angle of the rotation disc based on the first displacement and the second displacement.

According to such a configuration, a further arrangement may be made wherein, with the signal processing method of the optical encoder including a first annular slit and a second annular slit which are decentered in a mutually different direction, and a third annular slit of which at least the decentered direction or decentered amount differs from that of the first annular slit and the second annular slit, the displacement in the radial direction of each of the first through third annular slits is calculated, and a rotational angle is detected from this displacement, and accordingly, even in the event that the rotation disc is attached with the rotation center deviating, a rotational angle can be detected accurately over the entire circumference of 0 through 360 degrees.

The optical encoder may further include a signal processing device including a displacement detection processing unit for calculating the first displacement and the second displacement, and also calculating the rotational angle of the rotation disc based on the first displacement and the second displacement, a switchover processing unit for switching an input signal to the displacement detection processing unit, and a storage unit for storing the first displacement and the second displacement calculated at the displacement detection processing unit, with the displacement detection processing unit calculating the first displacement in the case that the signal from the first detecting unit is input by the switchover processing unit, and calculating the second displacement in the case that the signal from the second detecting unit is input, and calculating a rotational angle in the case that the first displacement and the second displacement stored in the storage unit are input.

The optical encoder may further include a signal processing device including a first displacement detection processing unit for calculating first displacement that is displacement in the radial direction of the rotation axis of the first annular slit based on the signal from the first detecting unit, a second displacement detection processing unit for calculating second displacement that is displacement in the radial direction of the rotation axis of the second annular slit based on the signal from the second detecting unit, a third displacement detection processing unit for calculating third displacement that is displacement in the radial direction of the rotation axis of the third annular slit based on the signal from the third detecting unit, and an angle detection processing unit for calculating the rotational angle of the rotation disc based on the first displacement through third displacement.

The optical encoder may further include a signal processing device including a switchover processing unit for switching the signals from the first through third detecting units, a displacement detection processing unit for detecting the first displacement in the case that the signal from the first detecting unit is input by the switchover processing unit, the second displacement in the case that the signal from the second detecting unit is input by the switchover processing unit, and the third displacement in the case that the signal from the third detecting unit is input by the switchover processing unit, and an angle detection processing unit for calculating the rotational angle of the rotation disc based on the first displacement through third displacement.

The optical encoder may further include a signal processing device including a displacement detection processing unit for calculating the first displacement through third displacement, and also calculating the rotational angle of the rotation disc based on the first displacement through third displacement, a switchover processing unit for switching an input signal to the displacement detection processing unit, and a storage unit for storing the first displacement through third displacement calculated at the displacement detection processing unit, with the displacement detection processing unit calculating the first displacement through third displacement in the case that the signals from the first through third detecting units are input by the switchover processing unit, and calculating the rotational angle in the case that the first displacement through third displacement stored in the storage unit are input.

A signal processing method of an optical encoder according to an embodiment of the present invention is a signal processing method of an optical encoder including a rotation disc, which is attached to a rotation axis, having an annular slit made up of multiple equal-pitched concentric slit patterns formed decentered as to the rotation center of the rotation axis, and an absolute-value-related detecting unit, which is provided to a fixed member, for detecting transmitted light or reflected light from a light source for irradiating the annular slit and the annular slit, wherein the annular slit includes a first annular slit and a second annular slit which are decentered in a mutually different direction, the absolute-value-related detecting unit includes a first detecting unit corresponding to the first annular slit, and a second detecting unit corresponding to the second annular slit, and the absolute rotational angle of the rotation axis is detected from the detected signal output from the absolute-value-related detecting unit, the signal processing method including the steps of: calculating first displacement that is displacement in the radial direction of the rotation axis of the first annular slit based on the signal from the first detecting unit, calculating second displacement that is displacement in the radial direction of the rotation axis of the second annular slit based on the signal from the second detecting unit, and calculating the rotational angle of the rotation disc based on the first displacement and the second displacement.

A signal processing method of an optical encoder according to an embodiment of the present invention is a signal processing method of an optical encoder including a rotation disc, which is attached to a rotation axis, having an annular slit made up of multiple equal-pitched concentric slit patterns formed decentered as to the rotation center of the rotation axis, and an absolute-value-related detecting unit, which is provided to a fixed member, for detecting transmitted light or reflected light from a light source for irradiating the annular slit and the annular slit, wherein the annular slit includes a first annular slit and a second annular slit which are decentered in a mutually different direction, and a third annular slit formed so that at least the decentered direction or decentered amount differs from those of the first annular slit and the second annular slit, the absolute-value-related detecting unit includes first through third detecting units corresponding to the first through third annular slits respectively, and the absolute rotational angle of the rotation axis is detected from the detected signal output from the absolute-value-related detecting unit, the signal processing method including the steps of: calculating first displacement that is displacement in the radial direction of the rotation axis of the first annular slit based on the signal from the first detecting unit, calculating second displacement that is displacement in the radial direction of the rotation axis of the second annular slit based on the signal from the second detecting unit, calculating third displacement that is displacement in the radial direction of the rotation axis of the third annular slit based on the signal from the third detecting unit, and calculating the rotational angle of the rotation disc based on the first displacement through third displacement.

Obviously, numerous modifications and variations of the present invention are possible in light of the above teachings. It is therefore to be understood that within the scope of the appended claims, the invention may be practiced otherwise than as specifically described herein.

What is claimed is:

1. An optical encoder comprising:
    a rotation disc attached to a rotation axis and rotatable together with the rotation axis;
    an annular slit provided to said rotation disc and including multiple equal-pitched concentric slit patterns formed to be decentered as to a rotation center of said rotation disc, said annular slit including a first annular slit and a second annular slit which are decentered in a mutually different direction;
    a light source configured to irradiate light on said annular slit;
    an absolute-value-related detecting unit configured to detect transmitted light or reflected light irradiated from said light source and transmitted or reflected at said annular slit to output a detected signal, said absolute-value-related detecting unit including a first detecting unit corresponding to the first annular slit and a second detecting unit corresponding to the second annular slit; and
    a signal processing device configured to detect an absolute rotational angle of said rotation disc based on the detected signal output from said absolute-value-related detecting unit.

2. The optical encoder according to claim 1, wherein a slit pitch of said first annular slit and a slit pitch of said second annular slit are equal to or greater than a corresponding decentered amount as to a center of said rotation disc.

3. The optical encoder according to claim 1,
    wherein said annular slit further comprises a third annular slit formed so that at least one of a decentered direction and a decentered amount differs from those of said first annular slit and said second annular slit; and
    wherein said absolute-value-related detecting unit further comprises a third detecting unit corresponding to said third annular slit.

4. The optical encoder according to claim 3, wherein said annular slit comprises multiple concentric slits formed without decentering as to a center of said rotation disc.

5. The optical encoder according to claim 1,
wherein said rotation disc further comprises an incremental slit formed in a radial shape as to a center of said rotation disc; and
wherein said optical encoder further comprises:
an incremental light source configured to irradiate light on said incremental slit; and
an incremental detecting unit configured to detect transmitted light or reflected light from said incremental slit.

6. The optical encoder according to claim 5, wherein light is irradiated as to said annular slit and said incremental slit by a common light source.

7. The optical encoder according to claim 5, wherein based on an interpolation signal in which a repeat signal obtained from said incremental detecting unit is interpolated, said signal processing device interpolates said absolute rotational angle calculated based on the detected signal output from said absolute-value-related detecting unit.

8. The optical encoder according to claim 5, wherein substantial slit pitches of said annular slit and said incremental slit are the same.

9. The optical encoder according to claim 1, further comprising:
a light source slit configured to restrict the irradiated light from said light source,
wherein said absolute-value-related detecting unit comprises a fixed slit configured to restrict reflected light reflected at said annular slit, and a light reception element configured to receive light transmitted through said fixed slit, or a light reception element in a slit pattern shape where a same pitched slit as said annular slit is formed so as to receive the reflected light reflected at said annular slit while restricting the reflected light.

10. The optical encoder according to claim 1, wherein said signal processing device calculates a displacement of said annular slit in a radial direction of the rotation axis of said rotation disc based on the detected signal output from said absolute-value-related detecting unit, and calculates the rotational angle of said rotation disc based on the displacement.

11. A motor comprising:
an optical encoder comprising:
a rotation disc attached to a rotation axis and rotatable together with the rotation axis;
an annular slit provided to said rotation disc and including multiple equal-pitched concentric slit patterns formed to be decentered as to a rotation center of said rotation disc, said annular slit including a first annular slit and a second annular slit which are decentered in a mutually different direction;
a light source configured to irradiate light on said annular slit;
an absolute-value-related detecting unit configured to detect transmitted light or reflected light irradiated from said light source and transmitted or reflected at said annular slit to output a detected signal, said absolute-value-related detecting unit including a first detecting unit corresponding to the first annular slit and a second detecting unit corresponding to the second annular slit; and
a signal processing device configured to detect an absolute rotational angle of said rotation disc based on the detected signal output from said absolute-value-related detecting unit; and
a motor unit configured to rotate the rotation axis of said optical encoder.

12. A motor system comprising:
an optical encoder comprising;
a rotation disc attached to a rotation axis and rotatable together with the rotation axis;
an annular slit provided to said rotation disc and including multiple equal-pitched concentric slit patterns formed to be decentered as to a rotation center of said rotation disc, said annular slit including a first annular slit and a second annular slit which are decentered in a mutually different direction;
a light source configured to irradiate light on said annular slit;
an absolute-value-related detecting unit configured to detect transmitted light or reflected light irradiated from said light source and transmitted or reflected at said annular slit to output a detected signal, said absolute-value-related detecting unit including a first detecting unit corresponding to the first annular slit and a second detecting unit corresponding to the second annular slit; and
a signal processing device configured to detect an absolute rotational angle of said rotation disc based on the detected signal output from said absolute-value-related detecting unit;
a motor unit configured to rotate the rotation axis of said optical encoder; and
a control unit configured to output a control signal for controlling said motor unit to said motor unit based on the absolute rotational angle detected by said optical encoder.

* * * * *